(12) United States Patent
Boufleur et al.

(10) Patent No.: US 12,284,936 B2
(45) Date of Patent: Apr. 29, 2025

(54) ROW UNIT PLUGGING DETECTION AND CONTROL SYSTEM

(71) Applicant: Deere & Company, Moline, IL (US)

(72) Inventors: Fabio P. Boufleur, Horizontina (BR); Marlon L. Christmann, Horizontina (BR); Cary S. Hubner, Geneseo, IL (US)

(73) Assignee: Deere & Company, Moline, IL (US)

( * ) Notice: Subject to any disclaimer, the term of this patent is extended or adjusted under 35 U.S.C. 154(b) by 1037 days.

(21) Appl. No.: 17/194,736

(22) Filed: Mar. 8, 2021

(65) Prior Publication Data

US 2022/0279706 A1 Sep. 8, 2022

(51) Int. Cl.
| | | |
|---|---|---|
| *A01C 7/20* | (2006.01) | |
| *A01B 63/00* | (2006.01) | |
| *A01C 5/06* | (2006.01) | |
| *A01C 7/08* | (2006.01) | |
| *G01B 5/14* | (2006.01) | |
| *G05D 1/00* | (2006.01) | |
| *A01B 63/30* | (2006.01) | |
| *A01B 63/32* | (2006.01) | |

(52) U.S. Cl.
CPC ............ *A01C 7/203* (2013.01); *A01B 63/008* (2013.01); *A01C 5/062* (2013.01); *A01C 5/066* (2013.01); *A01C 7/08* (2013.01); *G01B 5/14* (2013.01); *G05D 1/0223* (2013.01); *A01B 63/30* (2013.01); *A01B 63/32* (2013.01); *A01C 7/084* (2013.01)

(58) Field of Classification Search
CPC ....... A01B 79/005; A01B 63/16; A01B 63/22; A01B 63/24; A01B 63/008; A01B 63/00; A01B 63/002; A01C 7/203; A01C 7/062; A01C 7/066
See application file for complete search history.

(56) References Cited

U.S. PATENT DOCUMENTS

| | | | |
|---|---|---|---|
| 4,059,161 A | 11/1977 | Smith et al. | |
| 4,483,401 A | 11/1984 | Robertson | |
| 5,050,372 A | 9/1991 | Heiskell | |
| 5,076,180 A | 12/1991 | Schneider | |

(Continued)

FOREIGN PATENT DOCUMENTS

| | | |
|---|---|---|
| CA | 2023798 C | 3/1994 |
| CA | 2695738 A1 | 6/2010 |

(Continued)

OTHER PUBLICATIONS

Ofice Action for U.S. App. No. 16/930,895, Dated Jul. 14, 2023, 35 pages.

(Continued)

*Primary Examiner* — Jamie L McGowan
(74) *Attorney, Agent, or Firm* — Christopher J. Volkmann; Kelly, Holt & Christenson, PLLC

(57) ABSTRACT

A method of controlling a mobile agricultural machine, the method comprising operating a row unit having a ground-engaging element to deliver product to a furrow formed by the row unit, receiving an indication of rotational speed of the ground-engaging element, determining that the rotational speed of the ground-engaging element is below a threshold, and controlling an action of the mobile agricultural machine based on the determination.

19 Claims, 19 Drawing Sheets

(56) References Cited

U.S. PATENT DOCUMENTS

| | | | |
|---|---|---|---|
| 5,507,351 A | | 4/1996 | Martin |
| 7,409,916 B2 | | 8/2008 | Fry et al. |
| 9,781,877 B2 | | 10/2017 | Matrangolo |
| 11,205,337 B1 | | 12/2021 | Derscheid et al. |
| 11,252,853 B2 | | 2/2022 | Blackwell et al. |
| 11,284,555 B2 | * | 3/2022 | Smith .................. G01C 9/00 |
| 11,579,590 B2 | | 2/2023 | Harmon et al. |
| 2006/0016375 A1 | | 1/2006 | Fry |
| 2009/0223096 A1 | | 9/2009 | Wimmer |
| 2016/0088786 A1 | | 3/2016 | Kornecki et al. |
| 2016/0340866 A1 | | 11/2016 | Koetz et al. |
| 2017/0298992 A1 | | 10/2017 | Koshi |
| 2018/0338409 A1 | | 11/2018 | Heathcote |
| 2019/0100309 A1 | | 4/2019 | Flood et al. |
| 2019/0239413 A1 | * | 8/2019 | DeGarmo .............. A01B 21/08 |
| 2020/0070906 A1 | | 3/2020 | Laperle et al. |
| 2020/0113126 A1 | | 4/2020 | Eising |
| 2020/0146204 A1 | | 5/2020 | Geng et al. |
| 2020/0296876 A1 | | 9/2020 | Lussier |
| 2020/0337213 A1 | | 10/2020 | Schoeny |
| 2020/0355667 A1 | * | 11/2020 | Schoeny .............. A01C 7/205 |
| 2021/0045276 A1 | * | 2/2021 | Henry .................. A01B 71/08 |
| 2021/0084803 A1 | * | 3/2021 | Harmon ................ A01B 49/02 |
| 2021/0099251 A1 | | 4/2021 | Podlozhnyuk et al. |
| 2021/0100154 A1 | * | 4/2021 | Henry .................. A01B 21/086 |
| 2021/0127547 A1 | * | 5/2021 | Smith .................. G01C 9/00 |
| 2021/0127552 A1 | | 5/2021 | Hubner et al. |
| 2021/0127563 A1 | | 5/2021 | Harmon et al. |
| 2021/0157521 A1 | | 5/2021 | Roy |
| 2021/0173399 A1 | | 6/2021 | Richard et al. |
| 2021/0192867 A1 | | 6/2021 | Fang et al. |
| 2021/0197625 A1 | | 7/2021 | Laperle et al. |
| 2021/0199079 A1 | | 7/2021 | Shimpi |
| 2021/0339758 A1 | | 11/2021 | Laperle et al. |

FOREIGN PATENT DOCUMENTS

| | | |
|---|---|---|
| CA | 2885452 A1 | 9/2016 |
| CA | 2889850 A1 | 10/2016 |
| CN | 205912447 U | 2/2017 |
| CN | 208191248 U | 12/2018 |
| EP | 1774844 A2 | 4/2007 |
| EP | 2055168 A1 | 5/2009 |
| EP | 2404492 A2 | 1/2012 |
| EP | 3011815 A1 | 4/2016 |
| EP | 3146828 A1 | 3/2017 |
| EP | 3257348 A1 | 12/2017 |
| FR | 2646321 A1 | 11/1990 |
| GB | 1541629 A | 3/1979 |
| WO | WO2009127066 A1 | 10/2009 |
| WO | WO2018020310 A1 | 2/2018 |

OTHER PUBLICATIONS

Extended European Search Report and Written Opinion issued in European Patent Application No. 20204518.3, dated Sep. 9, 2021, 15 pages.

Extended European Search Report and Written Opinion issued in European Patent Application No. 20204524.1, dated Apr. 1, 2021, 8 pages.

Extended European Search Report and Written Opinion issued in European Patent Application No. 20204723.9, dated Apr. 1, 2021, 8 pages.

Extended European Search Report and Written Opinion issued in European Patent Application No. 20204522.5, dated Mar. 17, 2021, 9 pages.

Extended European Search Report and Written Opinion issued in European Patent Application No. 20204520.9, dated Mar. 26, 2021, 5 pages.

Notice of Allowance for U.S. Appl. No. 16/783,440 dated Oct. 11, 2022, 8 pages.

Prosecution History for U.S. Appl. No. 17/062,802, including: Non-Final Office Action dated Mar. 27, 2023, and Restriction Requirement, 16 pages.

Restriction Requirement for U.S. Appl. No. 16/930,895, dated Feb. 1, 2023, 8 pages.

Application and Drawings for U.S. Appl. No. 18/152,384, filed Jan. 10, 2023, 59 pages.

Office Action for U.S. Appl. No. 16/930,895, Dated Dec. 15, 2023, 7 pages.

Non-Final Office Action for U.S. Appl. No. 16/783,440, dated Apr. 26, 2022, 23 pages.

Ts-drill Operating Manual, 10.2016, Kverneland Group, 129 pages, see page 49.

Extended European Search Report and Written Opinion issued in European Patent Application No. 22160712.0, dated Aug. 2, 2022, in 09 pages.

Application and Drawings for U.S. Appl. No. 16/783,440, filed Feb. 6, 2020, 59 pages.

Application and Drawings for U.S. Appl. No. 17/062,802, filed Oct. 5, 2020, 32 pages.

Application and Drawings for U.S. Appl. No. 62/928,667, filed Oct. 31, 2019, 36 pages.

Application and Drawings for U.S. Appl. No. 16/930,895, filed Jul. 16, 2020, 36 pages.

Office Action for U.S. Appl. No. 18/152,384, dated May 23, 2024, 17 pages.

* cited by examiner

ROW UNIT PLUGGING DETECTION AND CONTROL SYSTEM

RELATED APPLICATION

The present application relates to U.S. patent application Ser. No. 16/783,440 filed Feb. 6, 2020, which claims the benefit of U.S. provisional application Ser. No. 62/928,667 filed Oct. 31, 2019; the contents of these applications are hereby incorporated by reference in their entirety.

The present application also relates to U.S. patent application Ser. No. 17/062,802 filed Oct. 5, 2020, which claims the benefit of U.S. provisional application Ser. No. 62/928,600 filed Oct. 31, 2019; the contents of these applications are hereby incorporated by reference in their entirety.

FIELD OF THE DESCRIPTION

The present description generally relates to agricultural planting or seeding equipment. More specifically, but not by limitation, the present description relates to plugging control for a row unit of an agricultural planting machine.

BACKGROUND

There are a wide variety of different types of agricultural seeding or planting machines. The machines can include planters, grain drills, air seeders, or the like. An example planting machine includes row units. For instance, a row unit is often mounted on a planter with a plurality of other row units. The planter is often towed by a tractor over soil where seed is planted in the soil at desired depth within a plurality of parallel seed trenches that are formed in the soil, using the row units. Thus, these machines can carry one or more seed hoppers. The mechanisms that are used for moving the seed from the seed hopper to the ground often include a seed metering system and a seed delivery system. The row units on the planter follow the ground profile by using a combination of a downforce assembly, that imparts a downforce on the row unit to push disc openers into the ground to open a furrow, and gauge wheels to set the depth of penetration of the disc openers.

The discussion above is merely provided for general background information and is not intended to be used as an aid in determining the scope of the claimed subject matter.

SUMMARY

A method of controlling a mobile agricultural machine, the method comprising operating a row unit having a ground-engaging element to deliver product to a furrow formed by the row unit, receiving an indication of rotational speed of the ground-engaging element, determining that the rotational speed of the ground-engaging element is below a threshold, and controlling an action of the mobile agricultural machine based on the determination.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 8-1 and 8-2 are a flow diagram illustrating an example operation of a wireless machine component detection and processing system.

FIGS. 10-1, 10-2, and 10-3 are a flow diagram illustrating an example operation for plugging detection and control on an agricultural machine.

DETAILED DESCRIPTION

Figure 1:
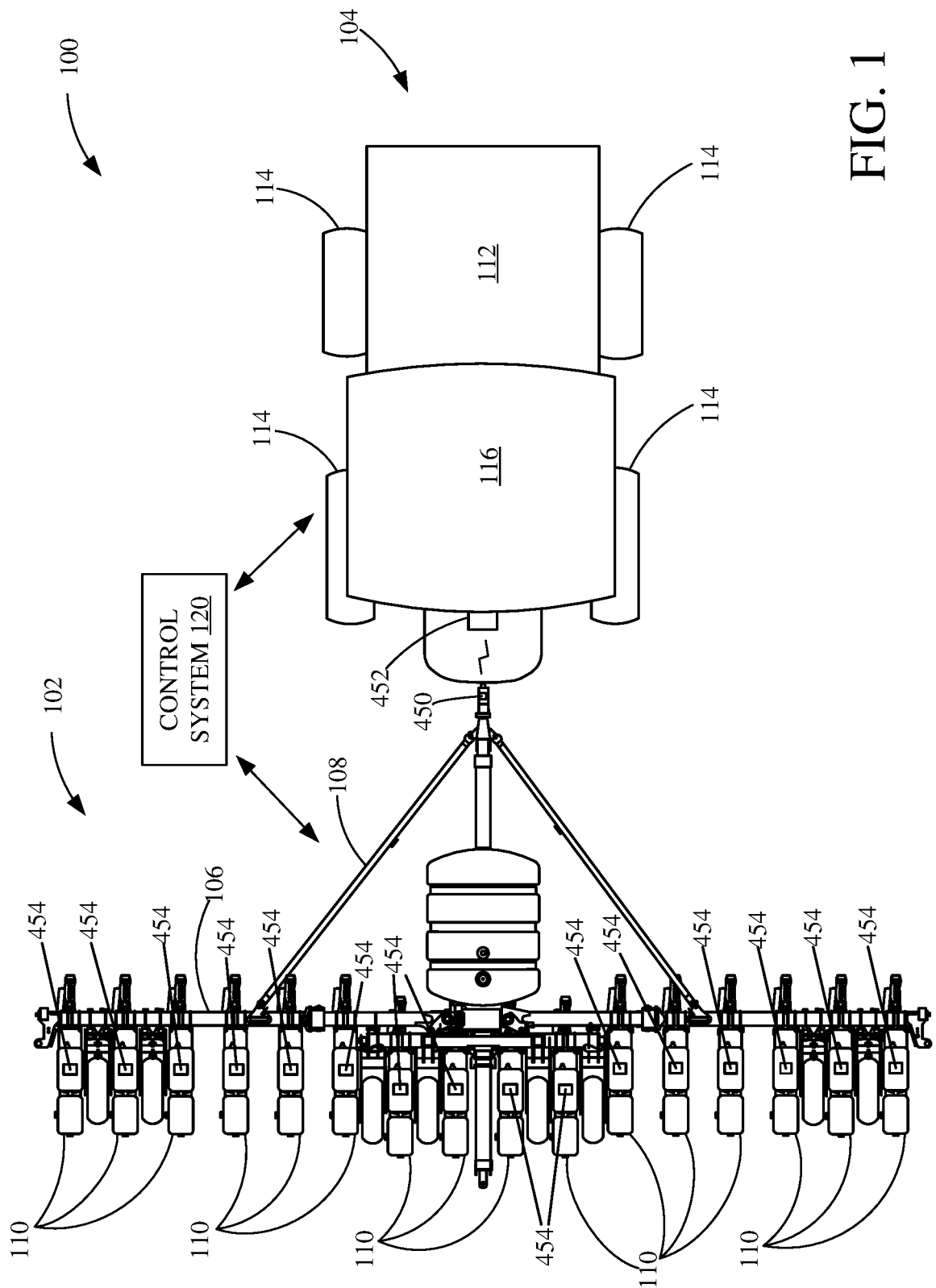
FIG. 1 is a top view of one example of an agricultural machine.

FIG. 1 is a top view of one example of an agricultural machine 100. Agricultural machine 100 illustratively includes a planting machine 102, in the form of a row planter (also referred to as planter 102) and a towing machine 104 (e.g., a tractor or other towing vehicle). Planter 102 includes a toolbar 106 that is part of a frame 108. FIG. 1 also shows that a plurality of row units 110 are mounted to toolbar 106. Planter 102 can be towed by towing machine 104, such as a tractor. Towing machine 104 can include a propulsion system, such as an engine, housed in engine compartment 112, ground-engaging elements 114, such as wheels or tracks, an operator compartment 116, such as a cab, which can include a number of machine controls, user input mechanisms as well as displays and other user interfaces. Towing machine 104 can be linked to planter 102 in a variety of ways, including, but not limited to, mechanically, electrically, hydraulically, pneumatically, etc. Through the linkage, an operator can control machine 104 to provide power to planter 102 and/or control the operation of planter 102, from the operator compartment 116 for example.

Agricultural machine 100 includes a control system 120, which is described in greater detail below. Control system 120 can be on one of planter 102 or machine 104, or elsewhere, and it can be distributed across various locations.

Figure 2:
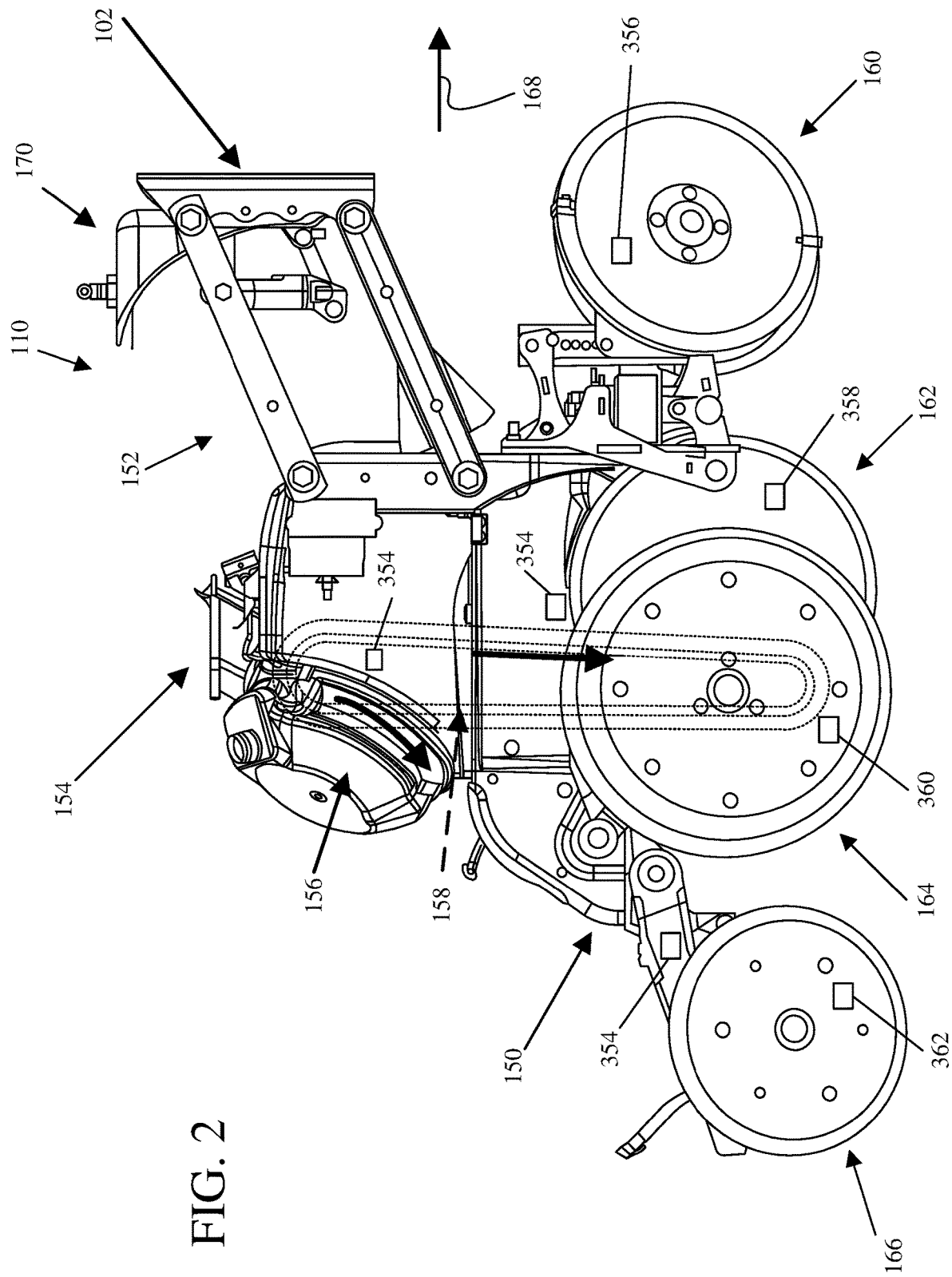
FIG. 2 shows one example of a side view of a row unit of the agricultural machine shown in FIG. 1.

FIG. 2 is a side view showing one example of row unit 110 in more detail. FIG. 2 shows that each row unit 110 illustratively has a frame 150 connected to toolbar 106 by a linkage (shown generally at 152). Linkage 152 is illustratively mounted to toolbar 106 so that it can move upward and downward (relative to toolbar 106).

Row unit 110 also illustratively has a seed hopper 154, or other seed storage mechanism, that stores seed. The seed is provided from hopper 154 to a seed metering system 156 that meters the seed and provides the metered seed to a seed delivery system 158 that delivers the seed from the seed metering system 156 to the furrow or trench generated by the row unit 110. In one example, seed metering system 156 uses a rotatable member, such as a disc or concave-shaped rotating member. Other types of meters can be used as well.

Row unit 110 includes a plurality of rotating or rotatable ground-engaging elements, each configured to perform a function for seed planting operations. For instance, in the example shown in FIG. 2, row unit includes a row cleaner 160, a furrow opener 162, a set of gauge wheels 164, and a set of row closers 166. In operation, as row unit 110 moves in the direction generally indicated by arrow 168, row cleaner 160 rotatably engages the ground ahead of furrow opener 162 and is configured to remove residue, such as plant debris from the previous growing season. Examples of row cleaner 160 include a toothed wheel or disc. Furrow opener 162 is configured to form a furrow or trench in the ground. Examples of furrow opener 162 include single-disc or double-disc blade openers. Gauge wheel 164 is configured to control the depth of the furrow created by furrow opener 162. For example, gauge wheel 164 is vertically adjustable to adjust the vertical position of the furrow opener 162 relative to the soil. In one example, row unit 110 includes a pair of gauge wheels on opposing side of the row. Row closer 166 is configured to close the furrow after the seed has been placed therein. In one example, row closer 166 includes one or more closing wheels. Other rotatable ground-engaging elements on row unit 110 can include, but are not limited to, a straw cutting blade, a fertilizer opener blade, etc. A downforce generator 170 can also be provided to controllably exert downforce to keep the row unit in desired engagement with the soil.

Figure 3:
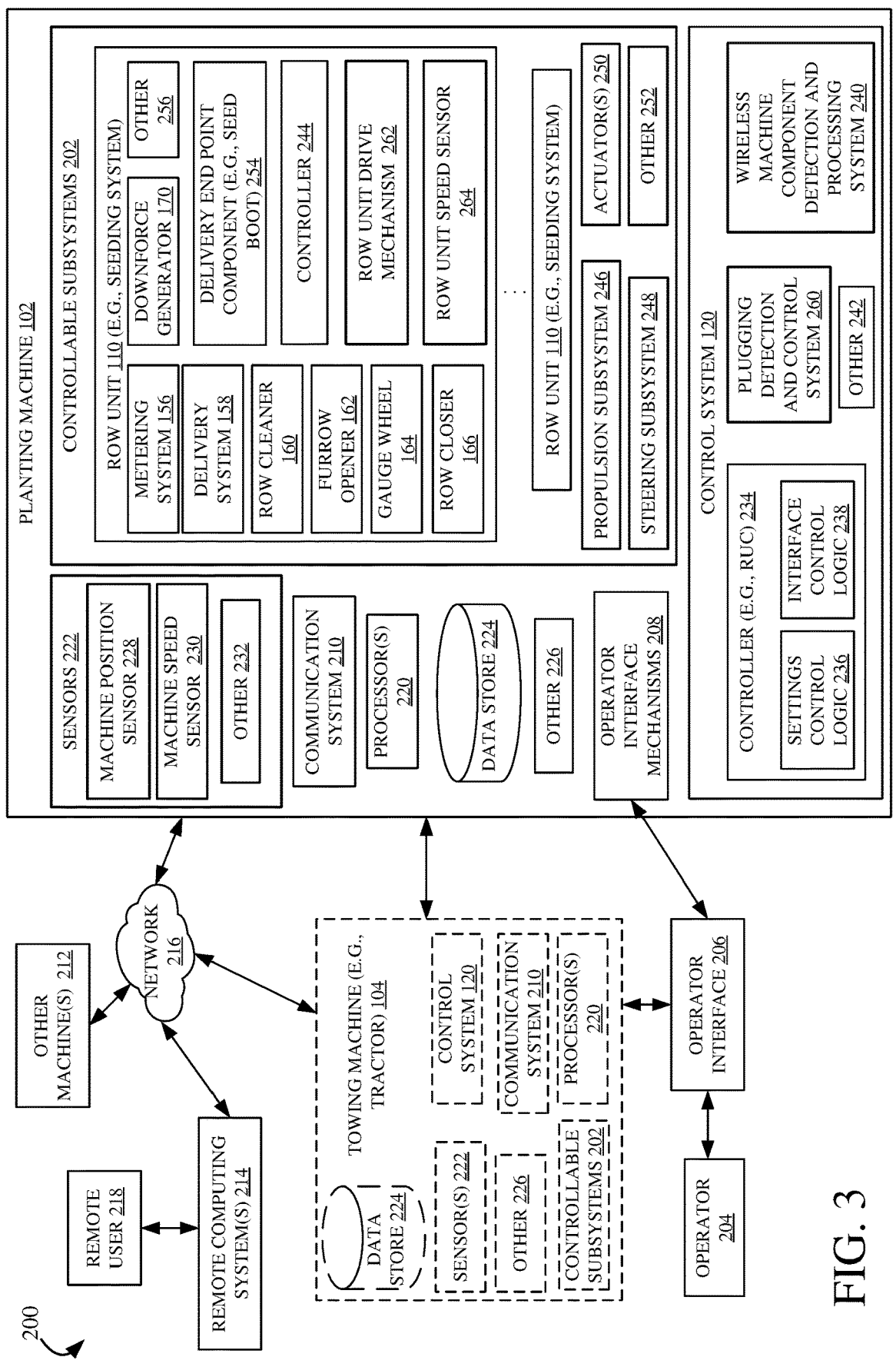
FIG. 3 is a block diagram of one example of an agricultural machine architecture that includes the agricultural planting machine shown in FIG. 1.

FIG. 3 is a block diagram of one example of an agricultural machine architecture 200. For sake of illustration, but not by limitation, architecture 200 will be described in the context of agricultural machine 100, shown in FIG. 1, including a plurality of row units 110. Each row unit 110 includes a seeding system having metering system 156 and delivery system 158 disposed thereon or otherwise associated with the row unit 110. While details of a single row unit 110 are illustrated in FIG. 3 and discussed in further detail below, it is noted that other row units 110 can include similar components.

As shown, planting machine 102 includes control system 120 configured to control a set of controllable subsystems 202 that perform operations on a worksite. For instance, an operator 204 can interact with and control machine 102 through an operator interface 206 provided by operator interface mechanisms 208. Operator 204 can also interact with and control towing machine 104 through operator interface mechanisms corresponding to machine 104. Operator interface mechanisms can include such things as a steering wheel, pedals, levers, joysticks, buttons, dials, linkages, etc. In addition, they can include a display device that displays user actuatable elements, such as icons, links, buttons, etc. Where the device is a touch sensitive display, those user actuatable items can be actuated by touch gestures. Similarly, where operator interface mechanisms include speech processing mechanisms, then operator 204 can provide inputs and receive outputs through a microphone and speaker, respectively. Operator interface mechanisms can include any of a wide variety of other audio, visual or haptic mechanisms.

Planting machine 102 includes a communication system 210 configured to communicate with other systems or machines in architecture 200. For example, communication system 210 can communicate with other local machines, such as towing machine 104 and/or other machines 212 operating on a same worksite as planting machine 102. In the illustrated example, communication system 210 is configured to communicate with one or more remote computing systems 214 over a network 216. Network 216 can be any of a wide variety of different types of networks. For instance, it can be a wide area network, a local area network, a near field communication network, a cellular communication network, or any of a wide variety of other networks, or combinations of networks.

Communication system 210 can include wireless communication logic, which can be substantially any wireless communication system that can be used by the systems and components of planting machine 102 to communicate information. In one example, communication system 210 communicates over a CAN bus (or another network, such as an Ethernet network, etc.) to communicate information. This information can include the various sensor signals and output signals generated based on the sensor variables and/or sensed variables.

A remote user 218 is illustrated as interacting with remote computing system 214, which can be a wide variety of different types of systems. For example, remote computing system 214 can be a remote server environment, remote computing system that may be used by remote user 218, such as to receive communications from or send communications to planting machine 102 through communication system 210. Further, remote computing system 214 can include a mobile device, a remote network, or a wide variety of other remote systems. Remote user 218 can receive communications, such as notifications, requests for assistance, etc., from planting machine 102 on a mobile device. Remote computing system 214 can include one or more processors or servers, a data store, and it can include other items as well.

FIG. 3 also shows that planting machine 102 includes one or more processors 220, one or more sensors 222, a data store 224, and can include other items 226 as well. Sensors 222 can include any of a wide variety of sensors. For instance, sensors 222 can include machine position sensors 228, machine speed sensors 230, and can include other sensors 232 as well.

Machine position sensor 228 is configured to identify a position of planting machine 102 and/or a corresponding route (e.g., heading) of planting machine 102 as it traverses the worksite. Position sensor 228 can include, but is not limited to, a Global Navigation Satellite System (GNSS) receiver that receives signals from a GNSS satellite transmitter. Position sensor 228 can also include a Real-Time Kinematic (RTK) component that is configured to enhance the precision of position data derived from the GNSS signal from a receiver. Illustratively, an RTK component uses measurements of the phase of the signal's carrier wave in addition to the information content of the signal to provide real-time corrections, which can provide up to centimeter-level accuracy of the position determination.

Machine speed sensor 230 are configured to output a signal indicative of a speed of planting machine 102. Sensor 230 can sense the movement of one or more ground-engaging elements (e.g., wheels or tracks) and/or can utilize signals received from other sources, such as position sensor 228.

Control system 120 includes a controller 234, which can include settings control logic 236 and interface control logic 238. Control system 120 also includes a wireless machine component detection and processing system 240, and it can include other items 242. Controller 234, in one example, includes a row unit controller (RUC) configured to control row units 110, either directly or with a controller 244, which can include one or more processors. For example, control system 120 is configured to control one, or both, of metering system 156 and delivery system 158 to place seeds at desired locations (e.g., defining in a planting map) based on the location and speed of planting machine 102.

Interface control logic 238 is configured to generate control signals to control operator interface mechanisms 208, such as a display device, to provide, and detect operator interaction with, operator interfaces 206.

Settings control logic 236 is configured to generate settings that are applied to, or otherwise control, controllable subsystems 202. For example, controllable subsystems 202 can include row units 110 that are independently controllable by control system 120. For instance, control system 120 is configured to independently control sections of row units (e.g., a plurality of sections each having one or more row units) to selectively plant the field as planting machine 102 traverses the field. Each row unit can be controlled by, for example, turning a seed meter on or off, raising and lowering the row unit, rotatably driving ground-engaging elements, etc.

It is noted that while planting machine 102 is illustrated in FIG. 3 as a towed implement, that is towed by towing machine 104, in one example planting machine 102 can be self-propelled. For instance, controllable subsystems 202 can include a propulsion subsystem 246 and a steering subsystem 248. Also, it is noted that elements of planting machine 102 can be provided on, or distributed across, towing machine 104, which is represented by the dashed blocks in FIG. 3.

Controllable subsystems 202 can include one or more different actuators 250 that can be used to change machine settings, machine configuration, etc., and can include a wide variety of other systems 252. In one example, controllable subsystems 202 include operator interface mechanisms 208, such as display devices, audio output devices, haptic feedback mechanisms, as well as input mechanisms.

Row unit 110 can also include a delivery endpoint component 254 configured to deliver the seed into the furrow, and can include other items 256 as well.

During operation, terrain material (e.g., soil, crop residue, other debris etc.) can build up on or in proximity to a rotatable element (e.g., row cleaner 160, furrow opener 162, gauge wheel 164, and row closer 166) thereby causing the rotatable element to experience a plugging or fouling condition in which the rotatable element become clogged, which degrades operation of the rotatable element. In a plugged state, the speed of the rotatable element is reduced which can cause significant slippage of the element. Plugging conditions can affect performance the row unit. For example, when planting in high moisture conditions, the trench opening blade (as well as other elements on the row unit) can become plugged with soil and/or field residue. As this occurs, the trench opening blade rotation begins to slow, and can eventually stop rotating. The reduced blade rotation reduces the quality of the seed bed in the furrow, which can affect germination and reduce yield.

The operator of the machine is typically unable to visually monitor all the row units at the same time, especially on large planters having many row units. A plugging condition can happen on any row and the longer the operator takes to notice the condition, the worse the plugging condition can become, further reducing performance of the row unit.

As discussed in further detail below, control system 120 includes a row unit plugging detection and control system 260 configured to detect or predict plugging conditions on row units 110 and to control, either itself, or through operation of controller 234, machine 102 based on the plugging condition. For example, control system 260 monitors the rotational speed of elements on the row unit to automatically detect plugging conditions and controls the machine to perform an action to rectify the plugging condition. For example, this can include alerting the operator through a display or other operator input/output mechanism. Alternatively, or in addition, the row unit, or the machine, can be controlled to perform an operation directed to removing the plugging condition. This can increase planter uptime and reduce operator time expenditure in cleaning row units of the planting machine.

In the example shown in FIG. 3, row unit 110 includes at least one row unit drive mechanism 262 configured to drive one or more of the rotatable elements (e.g., row cleaner 160, furrow opener 162, gauge wheel 164, row closer 166, a straw cutting blade, a fertilizer opener blade, etc.). For example, row unit drive mechanism 262 can include one or more motors (e.g., electric motor(s), pneumatic motor(s), hydraulic motor(s), etc.). Each rotatable element can be individually driven by a different motor, and multiple rotatable elements can be driven by a same motor (e.g., with the same speed or different speeds using gearing assemblies). Further, the control of row unit drive mechanism 262 can be automatic and/or based on input from operator 204.

For example, but not by limitation, a plugging condition of a particular rotatable element on row unit 110 can be addressed by control system 120 increasing the rotational speed of the rotatable element, reducing the rotational speed of the rotatable element, reversing the rotational direction of the rotatable element, oscillating or shaking the rotatable element, etc.

Figure 4:
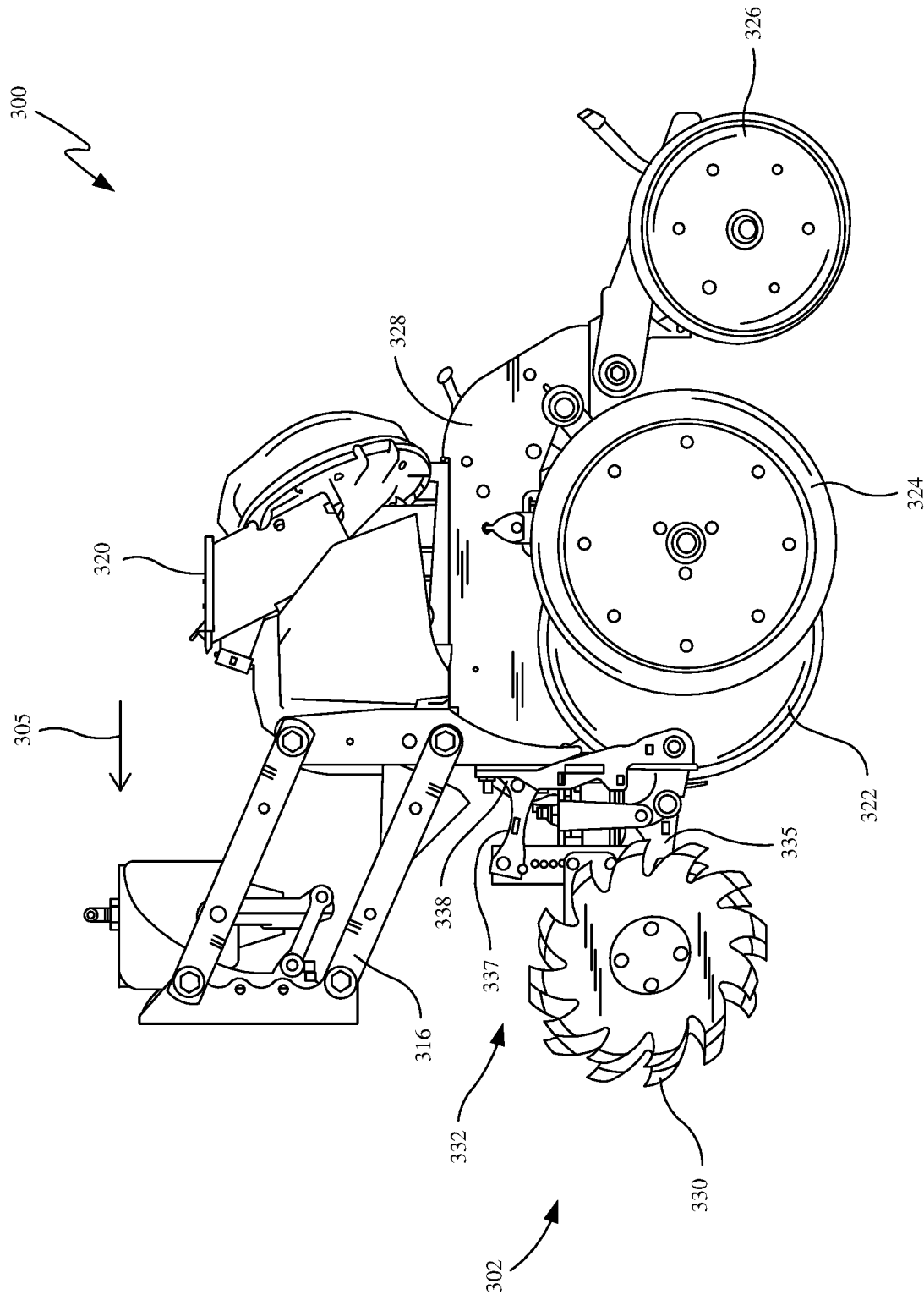
FIG. 4 is a side view of an example row unit of an agricultural planting machine.

FIG. 4 illustrates one example of a planting machine row unit 300 having a drive mechanism operably coupled to a rotatable ground-engaging element on row unit 300. In the described example, the drive mechanism is configured to drive rotation of a row cleaner 302 on row unit 300. However, it is understood that the drive mechanism can be utilized to drive rotation of other ground-engaging elements on row unit 300.

Row unit 300 is adapted for use with an agricultural implement. Row unit 300 may be coupled to a main frame of the agricultural implement via a parallel linkage 316 or another suitable linkage. Parallel linkage 316 allows for independent vertical movement of row unit 300 as row unit 300 traverses along uneven ground.

Each row unit 300 can include a row unit shank 328 to which a seed hopper 320 is coupled. Seed hopper 320 can store seed to be planted by the row unit 300 during a planting operation. Seed can be deposited within a trench or furrow formed by opening disks 322. The depth at which the opening disk or disks 322 is set relative to the soil can be set by a gauge wheel or wheels 324 and a depth-setting mechanism. Closing wheels 326 can be further coupled to the shank 328 of the row unit 300 in order to close or cover the trench with soil.

Row unit 300 can also include a fertilizer applicator including a hopper or container 308 for storing fertilizer, e.g., dry granular fertilizer, or a tank for storing gaseous or liquid fertilizer. The fertilizer applicator can further include a cutting disk positionable at a defined depth into the soil to form a furrow or trench therein. The fertilizer applicator can further include a gauge used to set the depth of the furrow or trench to be formed by the cutting disk. It should be appreciated that the cutting disk and opening disks 322 described above are discrete from clearing disks, which will be described below in greater detail as clearing disks 330.

Row cleaner 302 includes one or more clearing disks 330. Clearing disks 330 are configured to clear crop residue, soil, or other material from a row of the field to be planted and fertilized.

Figure 5:
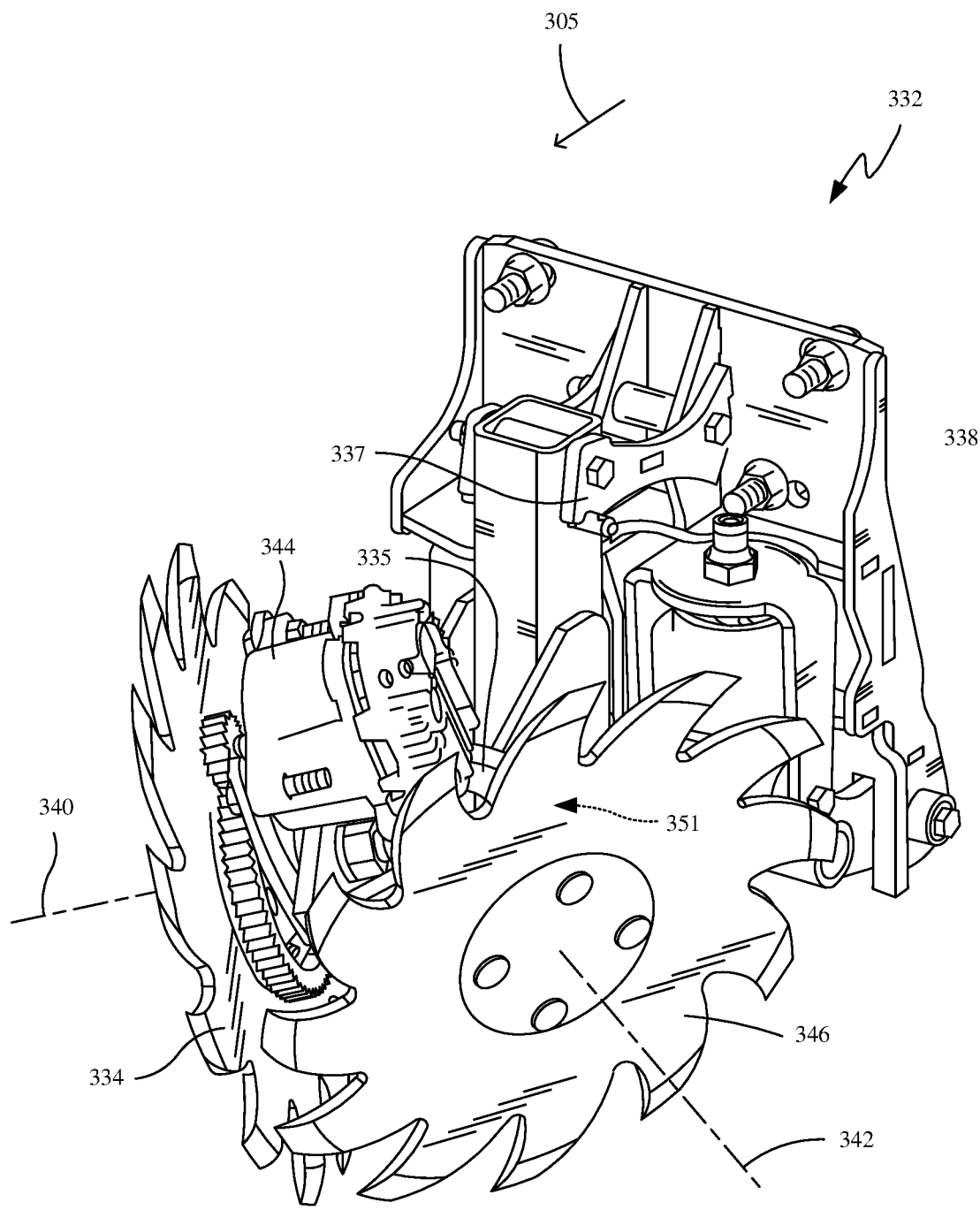
FIG. 5 is a front perspective view of a portion of the row unit shown in FIG. 4.
Figure 6:
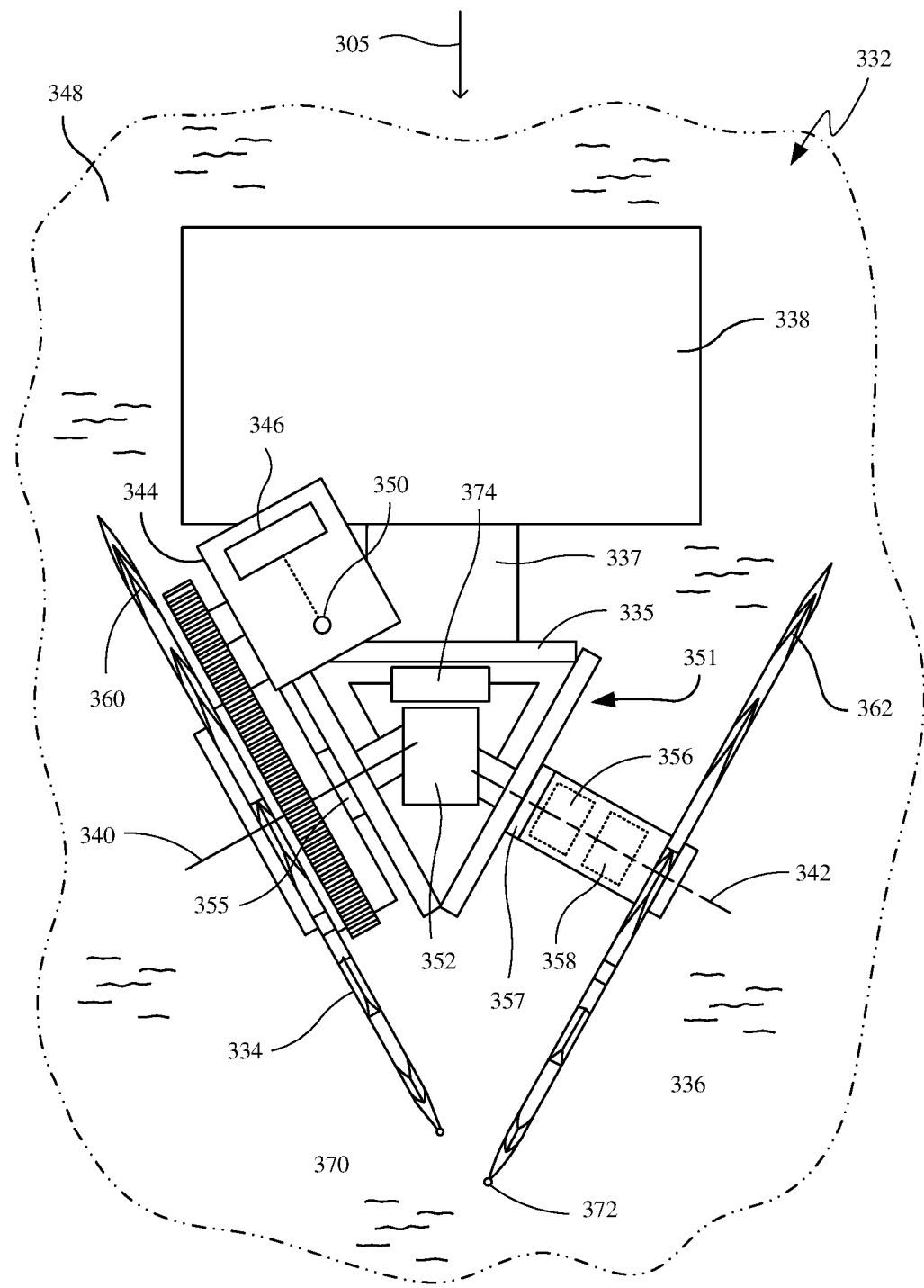
FIG. 6 is a top diagrammatic view of a portion of the row unit shown in FIG. 4.

As shown in FIGS. 5 and 6, clearing disks 330 are included in a clearing assembly 332. Clearing assembly 332 includes an attachment plate 338, an attachment frame 335, a linkage assembly 337 coupled therebetween, a drive clearing-disk 334, and a driven clearing-disk 336. Attachment plate 338 is coupled to row unit shank 328 (or otherwise arranged on row unit 300) in a forward-facing orientation, such that clearing disks 330 are arranged to be pushed by attachment plate 338 in the forward direction 305 during forward movement of row unit 300. Drive clearing-disk 334 is configured to drive rotation of driven clearing-disk 336. In the illustrative example, drive clearing-disk 334 is coupled to attachment frame 335 and configured to rotate about a first axis 340. The driven clearing-disk 336 is coupled to attachment frame 335 and configured to rotate about a second axis 342. The second axis 342 is offset from first axis 340 (i.e., second axis 342 is different than first axis 340).

In some examples, clearing assembly 332 also includes a final drive assembly configured to drive rotation of drive clearing-disk 334. The final drive assembly can be driven by a drive unit 344 or other power mechanism. In the illustrative example, drive unit 344 is an electric motor included in clearing assembly 332. It should be appreciated that row unit 300 can include a plurality of clearing assemblies 332, and each clearing assembly 332 can include a separate drive unit 344. Further, row unit 300 can move along several agricultural rows of field simultaneously. As such, each individual agricultural row can be cleared by a corresponding clearing assembly 332 having a corresponding drive unit 344.

In some examples, each clearing assembly 332 can include a controller 346 electrically coupled to drive unit 344. The controller 346 is configured to adjust the drive speed of drive unit 344 in response to one or more factors including: a speed of forward movement of row unit 300 over the soil, a height of drive clearing-disk 334 relative to a surface of the soil 348, a height of driven clearing-disk 336 relative to a surface of the soil, an amount of crop residue in an agricultural row of the field, and a downforce on a portion row unit 300. In some examples, each clearing assembly 332 can further include a sensor 350 electrically coupled to controller 346. Sensor 350 is configured to identify the amount of crop residue or other material in an agricultural row of the field and transmit a signal to controller 346 indicative of the amount of crop residue or other material. Controller 346 can also be configured to adjust the drive speed in response to a predetermined prescribed operating plan for the field. In other examples, a user can adjust the drive speed of drive unit 344 via a user input separate from controller 346.

Clearing assembly 332 further includes a gear assembly 351 that is coupled between drive clearing-disk 334 and driven clearing-disk 336. Gear assembly 351 is configured to transmit rotational motion from drive clearing-disk 334 to driven clearing-disk 336. As such, gear assembly 351 is drivingly coupled between drive clearing-disk 334 and driven clearing-disk 336.

In some examples, gear assembly 351 includes a number of disk-connecting gears 352 (such as bevel gears and spur gears) for transmitting rotational motion from drive clearing-disk 334 to driven clearing-disk 336. In some examples, gear assembly 351 includes gear-step unit 356 configured rotate driven clearing-disk 336 at different speed than that of drive clearing-disk 334. In the illustrative example, drive clearing-disk 334 is rotated by drive unit 344 (or by other means) at a first speed, and gear-step unit 356 is configured to rotate driven clearing-disk 336 at a second speed greater than the first speed.

In some examples, gear assembly 351 includes a slip clutch 358 including a first portion fixed to drive clearing-disk 334 and a second portion fixed to driven clearing-disk 336. The slip clutch 358 is reconfigurable between a first mode and a second mode. In the first mode, slip clutch 358 is engaged with drive clearing-disk 334 and driven clearing-disk 336, and slip clutch 358 facilitates rotation of driven clearing-disk 336 by drive clearing-disk 334. In the second mode, a first portion of slip clutch 358 disengaged from the second portion of slip clutch 358 to allow drive clearing-disk 334 to rotate independently of driven clearing-disk 336. With this arrangement, if driven clearing-disk 336 encounters immovable debris along the agricultural row, driven clearing-disk 336 can cease rotation and drive clearing-disk 334 can continue to rotate without damaging gear assembly 351 or other components of clearing assembly 332.

Referring again to FIG. 3, row unit 110 includes one or more row unit speed sensors 264 configured to generate sensor signal indicative of rotational speeds of one or more of the rotatable ground-engaging elements on row unit 110. For example, a speed sensor 264 can be configured to detect an angular speed and/or position of a shaft or hub on which the rotatable element is mounted. Alternatively, or in addition, speed sensor 264 can be configured to directly sense the rotatable element itself, and generate a signal indicate of movement of the rotatable element. Examples of speed sensor 264 includes, but is not limited to, an angle encoder, a Hall Effect sensor, an optical sensor, a magnetic sensor, or any of a wide variety of other sensors.

In one example, operations of row unit 110 are detected using wireless machine component detection and processing system 240. System 240 is configured to provide automatic identification of components that are coupled to, or otherwise operational with, planting machine 102. The components are wirelessly identified by system 240 using unique identifiers, and operational data can be correlated to those uniquely identified components. Examples of components include the ground-engaging elements of row unit 110, as well as other components or parts installed on subsystems 202.

Figure 7:
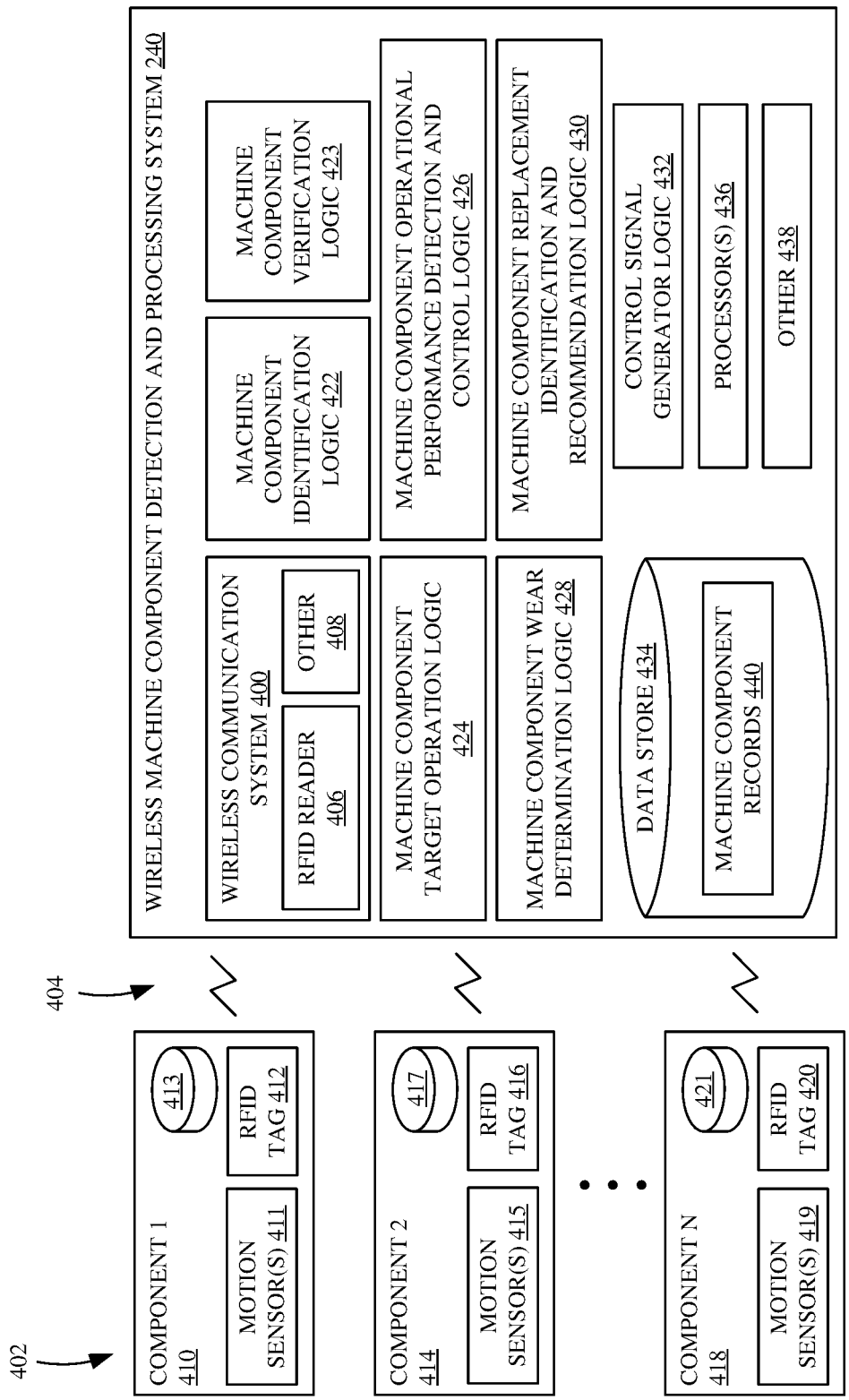
FIG. 7 is a block diagram of one example of a wireless machine component detection and processing system.

FIG. 7 is a block diagram showing one example of wireless machine component detection and processing system 240. As discussed in further detail below, in one example system 240 can be configured to perform automatic identification, through a wireless connection, of machine components that are coupled to or otherwise used by planting machine 102. Also, system 240 is configured to detect performance of components of machine 102.

System 240 includes a wireless communication system 400 configured to wirelessly communicate with a set of machine components 402 through a wireless communication channel 404. Channel 404 can comprise any suitable type of wireless communication channel. In one example, system 400 communicates with components 402 using electromagnetic radiation, such as radio frequency (RF) channels. One example includes Bluetooth communication. In another example, system 400 utilizes near field communication (NFC) or other radio-frequency identification technology (e.g., RFID).

For the sake of the present discussion, but not by limitation, system 400 will be described in the context of RF identification that identifies and tracks RFID tags corresponding to components 402. Accordingly, system 400 includes an RFID reader 406, and can include other items 408 as well. RFID reader 406 is configured to identify RFID tags that are embedded in, or otherwise attached to, components 402. Illustratively, a first component 410 includes an RFID tag 412, and a second component 414 includes an RFID tag 416. It is noted that components 402 can include any number of components, as represented by component N 418 and its associated RFID tag 420. Each RFID tag (e.g., tags 412, 416, 420) encodes information that uniquely identifies the corresponding machine component (e.g., components 410, 414, 418).

An example RFID tag comprises a passive tag that collects energy from interrogating radio waves of RFID reader 406 and, using this collected energy, transmits a response that is read by RFID reader 406. This response can include information such as an encoded identifier that it uniquely identifies the RFID tag and/or machine component, information about the machine component, and/or historical operational data for the machine component. For instance, the encoded information can include a manufacture date of the machine component, a part or serial number of the machine component, service life information indicative of usage history of the machine component, or any other information.

In one example, RFID reader 406 is positioned so that it automatically detects the RFID tag of the corresponding component upon coupling of the component to its corresponding subsystem. To illustrate, an example passive RFID system reads at a short distance of a few feet or less.

In another example, an RFID tag can comprise an active tag that has an on-board battery and periodically transmits its identification signal and/or encoded information. In another example, an RFID tag can comprise a battery-assisted passive tag that has an on-board battery and is activated when in the presence of RFID reader 406.

An RFID tag can be read-only, having a factory-assigned serial number that is used as a key in a database to identify the RFID tag and/or machine component. In another example, an RFID tag can be read/write where object-specific data can be written to the tag by system 400. As discussed in further detail below, lifecycle information such as runtime, cycle count, or other operational data can be written to the RFID tag.

Also, the machine component(s) can include on-board motion sensor(s) (e.g., sensors 411, 415, and 419), such as one or more accelerometers, gyroscopes, inertial measurement unites (IMUs), etc. The motion sensor(s) can be integrated with the RFID tag or can be a separate component. The motion sensor(s) communicate motion information, indicative of motion of the machine component, to system 240, either directly or through the corresponding RFID tag.

Additionally, machine component(s) 402 can include on-board data storage (e.g., data stores 413, 417, and 421). The data storage can be integrated with the RFID tag or can be a separate component that communicates with the RFID tag. The data storage can store information such as machine component identifiers, manufacturer or part number, historical operation data, lifecycle information, etc.

In the example of FIG. 7, system 240 includes machine component identification logic 422, machine component verification logic 423, machine component target operation logic 424, machine component operational performance detection and control logic 426, machine component wear determination logic 428, machine component replacement identification and recommendation logic 430, and control signal generator logic 432. System 240 is also illustrated as including a data store 434, one or more processors 436, and can include other items 438 as well.

Machine component identification logic 422 is configured to identify the specific machine components in the set of machine components 402. The identification of the particular machine component can be based on information encoded in the signal from the RFID tags embedded in or coupled to the component. Based on the signal, each machine component can be uniquely identified. Also, the identification can be based on machine component records 440 stored in data store 434. For instance, machine component records 440 uniquely identifies each machine component based on its corresponding tag, and can store any of a wide variety of different types of information that identifies the structural or performance characteristics of the component, as well as historical use data that can be used to indicate deterioration or wear of the component.

Machine component verification logic 423 is configured to verify the machine components 402 and/or control operation of machine 102 based on the verification. Machine component target operation determination logic 424 is configured to determine a target operation for the machine component based on its identification from the RFID tag. This determination can be based on data encoded in the RFID tag signal, data stored in records 440, or otherwise. Logic 424 is configured to determine a configuration or setting for machine 102 based on identification of components 402.

Machine component operational performance detection and control logic 426 is configured to detect operation of the identified components. This can include an instantaneous performance characteristic, such as a speed, temperature, pressure, or other operational characteristic of the component, as well as historical performance data. Logic 426 is configured to generate a control signal, either itself, or through operation of control signal generator logic 432, that controls machine 102. Accordingly, based on a detected operation of components 402 using the embedded RFID tags, machine 102 can be controlled in any of a number of ways. For example, system 240 can automatically control one or more of subsystems 202. Alternatively, or in addition, system 240 can control communication system 210 to send an indication of the detected operation of components 402 to another system or machine (e.g., machine 104, machine 212, system 214, etc.). In one example, logic 426 is controlled to write the performance data to the corresponding records 440.

Logic 426 can generate the operational performance data in any of a number of ways. In one example, logic 426 detects operation of component 410 based on the signal from tag 412. For example, tag 412 (or another component) on machine component 410 generates data indicative of movement of component 410. For example, motion sensor(s) 411 indicate movement of machine component 410, which can be sent by tag 412 and received by reader 406, which provides the data to logic 426. Alternatively, or in addition, logic 426 can receive sensor signals from one or more sensors (sensors 124) on machine 102. In the example of a wheel, disc, or other rotating ground-engaging element, RFID tag 412 can be embedded in the element, and read by reader 406 to identify the particular element.

Machine component deterioration determination logic 428 is configured to determine a level of deterioration or wear of machine components 402 based on the operational data. Based on the determination, a control signal can be generated to send or display a notification to the operator, to send a notification to another user (e.g., remote user 218 over network 216) or another machine (e.g., machine 104, 212), and/or to automatically control planting machine 102, such as by changing a speed or shutting down the corresponding system that is using the machine component.

As noted above, machine components 402 can include any of a wide variety of different types of components. For example, machine components 402 can include, but are not limited to, rotating elements on row unit 110, such as row cleaner 160, furrow opener 162, gauge wheel 164, and row closer 166.

With reference to FIG. 1, in one example an RFID tag (generally represented by 450) can be placed on frame 108 and read by an RFID reader (generally represented by 452) on towing machine 104. In this way, system 240 can identify that machine 102 has been coupled to the machine 104, and can track and store operational data corresponding to machine 102. RFID tag 450 can also transmit additional information, such as data that identifies the type and/or configuration of row units 110, historical usage data (e.g., hours, acres planted, etc.), recommended settings, lifecycle data, etc. Also, each row unit 110 can include one or more RFID readers 454. Each RFID reader 454 is configured to receive signals from one or more RFID tags on the corresponding row unit 110.

FIG. 2 illustrates example positions of RFID readers 454 to wirelessly detect the components of row unit 110. The positioning of RFID reader 454 in FIG. 2 is for sake of illustration only. Any number of RFID readers 454 can be positioned on row unit 110 at various locations depending on the components to be sensed and whether the RFID tags are passive, active, battery assisted, etc.

As shown in FIG. 2, a set of RFID tags 456, 458, 460, and 462 are mounted on rotatable ground-engaging elements of row unit. In one example, noted above, a motion sensor can be integrated (or provided as a separate component) with each RFID tag 456, 458, 460, and 462. RFID tags 456, 458, 460, and 462 (and the corresponding motion sensor) are positioned on row cleaner 160, furrow opener 162, gauge wheel 164, and row closer 166, respectively.

The RFID tags 456, 458, 460, and 462 are read by the RFID reader(s) 454 and identified and tracked by their unique identifiers. The operational data can also be used for controlling operation of row unit 110. This is discussed in further detail below. Briefly, an RFID tag (e.g., RFID 456 for row cleaner 160, RFID tag 458 for opener 162, RFID tag 460 for gauge wheel 164, RFID tag 462 for row closer 166) can be configured to obtain an indication of rotation, and to provide an indication of that sensed rotation to wireless machine component detection and processing system 240. Based on that indication, the system determines that the component is not rotating properly, such as by comparing the sensed rotation to a threshold or model of expected rotation. Further, based on determining that the component is not rotating properly, the system can control the machine in any of a variety of ways. For instance, an output device (e.g., display screen, speaker, etc.) can be controlled to output an indication that advises the operator of the condition. In another example, a corrective sequence is recommended to the operator and/or initiated automatically, such as raising and then lowering the row cleaners or row unit to try to clear debris that may be causing the issue. If the corrective sequence does not correct the issue, the operator could be advised to stop the machine and check for jamming situations that might require clearing. In another example, the issue can be caused by the RFID being missing or physically altered. Here, the operator can be alerted to inspect the component for damage (such as excessive opener blade wear) or to determine that the component actually broke off of the machine and needs replacement (such as a gauge wheel or closing wheel.) In another example, the signal from the RFID tag can indicate wear on the corresponding component (e.g., row closer 166), and the system can adjust a setting, such as to increase or decrease the down pressure on row unit 110).

Figures 1, 8:
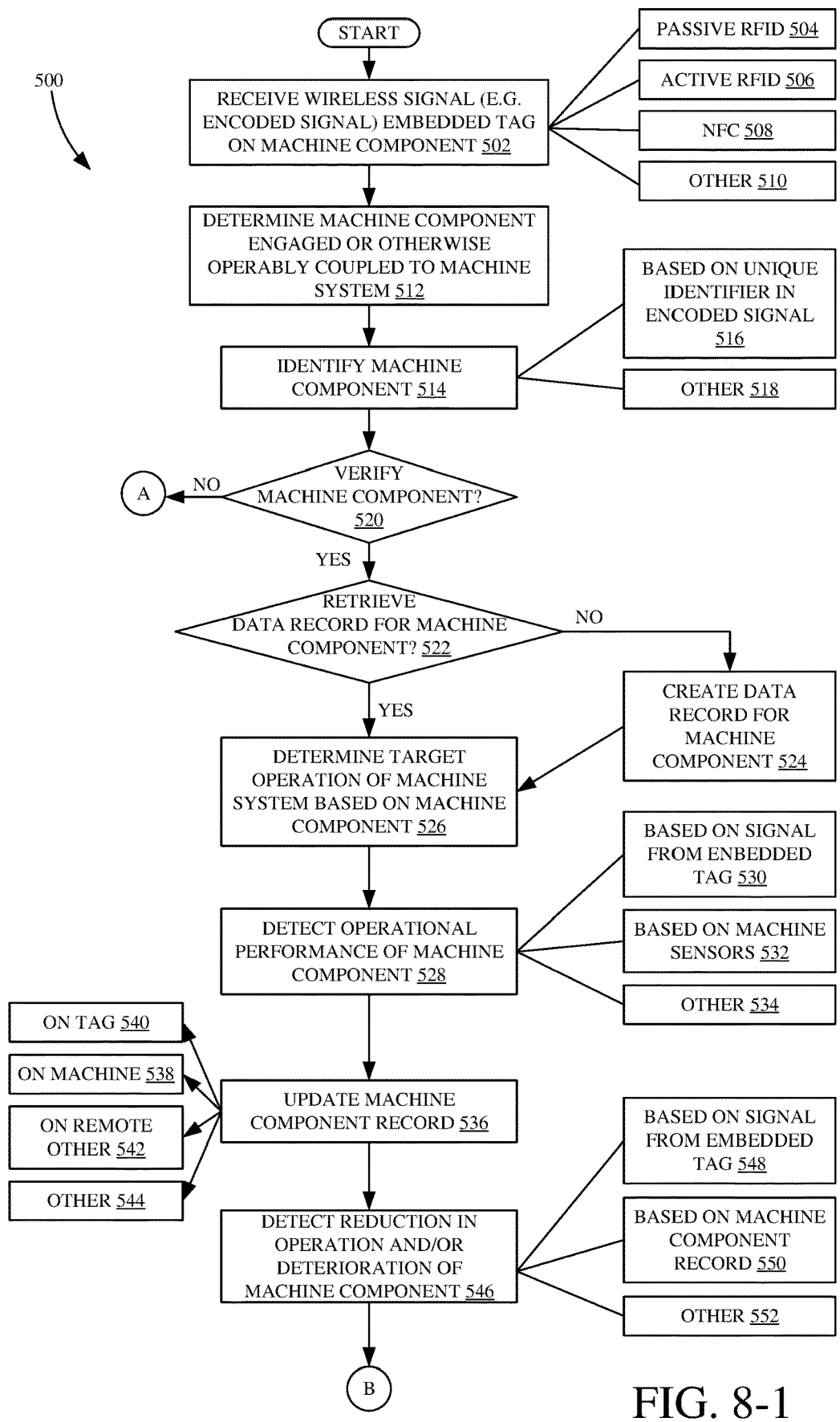
Figures 2, 8:
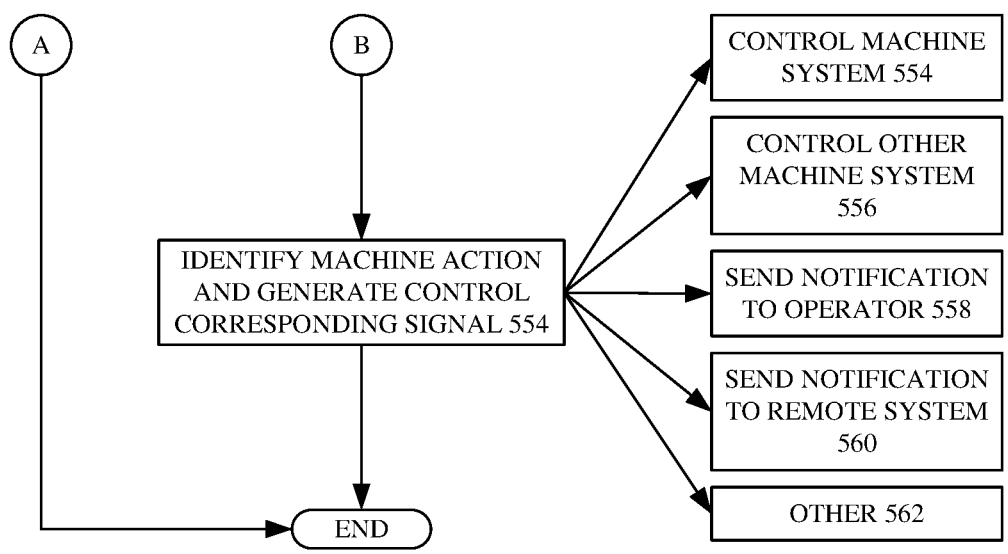

FIGS. 8-1 and 8-2 (collectively referred to as FIG. 8) is a flow diagram 500 illustrating one example of the operation for wireless machine component detection and processing. For sake of illustration, but not by limitation, FIG. 8 will be described in the context of system 240 on machine 102.

At block 502, a wireless signal is received from a tag (embedded or otherwise provided on) a machine component. In one example, the machine component comprises a ground-engaging element on row unit 110 of machine 102. The wireless signal, in one example, comprises an encoded signal that is encoded with information that identifies the machine component, either directly or through a mapping stored in a machine component record. The wireless signal can be received through any of a variety of types of wireless systems. In one example, the signal is received from a passive RFID tag (block 504), that sends a response to a signal from an RFID reader. In another example, the wireless signal can comprise a signal from an active RFID tag (block 506). In another example, an NFC system is utilized. This is represented by block 508. Of course, the wireless signal can be received using other types of wireless communication systems, channels, and protocols. This is represented by block 510.

At block 512, system 240 determines that the machine component is engaged or otherwise operably coupled to the corresponding machine system. In one example, this determination is based on the signal received at block 502. For example, in the case of a passive RFID tag, the close proximity required for the passive tag activation can indicate that the machine component is properly coupled for operation. In yet another example, a sensor can be utilized to identify the machine component coupling.

At block 514, logic 422 identifies the machine component based on the signal received at block 502. Illustratively, this is based on a unique identifier in the encoded signal. This is represented by block 516. The machine component can be identified in other ways as well. This is represented by block 518.

At block 520, logic 423 verifies the machine component to determine whether to allow operation of the corresponding machine system. As noted above, this verification can limit operation based on a manufacturer, configuration, or other characteristic of the machine component.

Based on the machine component verification, block 522 determines whether a data record of the machine component exists. This can include accessing machine component records to identify a matching record for the identified machine component. The record can also include information, such as a manufactured date, and lifecycle data indicating a total number of cycles before the machine component is be replaced. If no data record is identified for the machine component (e.g., it may be a machine component that has not been used before), a new data record can be created in the data store. This is represented by block 524.

At block 526, a target operation of the machine system can be determined based on the data for the machine component. In the ground-engaging element example mentioned above, a speed of the element can be set based on the information identified from the corresponding record and/or from encoded data in the signal from the RFID tag.

At block 528, operational performance of the machine component is detected. The operational performance can indicate any of a variety of performance characteristics. For example, it can indicate a duration of use, a distance, a number of rotations, a load on the component, an operating temperature, structural strain on the component, to name a few.

The operational performance can be detected based on the signal from the embedded tag. This is represented by block 530. For example, based on the signal detected by reader 306, movement and/or a position of the machine component can be detected. Alternatively, or in addition, as noted above the machine component can include sensors such as gyroscope(s), accelerometer(s), inertial measurement units (IMUs), etc. These sensors can be part of the embedded tag, or otherwise positioned on the machine component and communicate with the tag to provide the information.

Also, the operational performance of the machine component can be detected based on machine sensors. This is represented by block 532. For example, position or movement sensors (e.g., sensors 222) can indicate movement, load, temperature, strain, or any other characteristic of the machine component. This operational performance data is associated with the machine component. Of course, the operational performance of the machine component can be detected in other ways as well. This is represented by block 534.

At block 536, the machine component record corresponding to the machine component is updated to reflect the operational performance detected at block 528. The machine component record can be stored on one or more of (or the record can be distributed across) machine 102 (block 538), the tag on the machine component (block 540), and/or a remote system (e.g., system 214) (block 542). Alternatively, or in addition, the machine component record can be stored in other places as well. This is represented by block 544.

At block 546, a reduction in operation (e.g., reduction in rotational speed below a threshold) is detected. In another example, deterioration or wear of the machine component is detected. As noted above, this can be based on the signal received from the embedded tag at block 502. This is represented by block 548. For example, wear of the machine component can result in a change to the signal, indicating that the tag has become damaged, has been destroyed, or is otherwise no longer operating properly. Alternatively, or addition, the deterioration of the machine component can be detected based on the operational data stored in the machine component record. This is represented by block 550. For instance, logic 428 can determine that a gauge wheel has exceeded its lifecycle by comparing data in the data record. Of course, the deterioration of the machine component can be detected in other ways as well. This is represented by block 552.

At block 554, a machine action is identified based on one or more of the target operations determined at block 526 and the reduction in operation (and/or deterioration) detected at block 546. For example, a corresponding control signal can be generated based on the identified machine action.

In one example, the control signal controls the machine system corresponding to the machine component. This is represented by block 554. For instance, if block 546 determines that the gauge wheel has a rotational speed below a threshold speed, or determines threshold level of wear, the control signal can control the system to cease operation and/or generate a notification for the operator.

Other machine systems can be controlled as well. This is represented by block 556. For instance, if the deterioration at block 546 indicates that a valve, bearing, etc. of steering subsystem 248 has a threshold level of wear, the control signal can control the propulsion subsystem 246 to slow the machine to a target velocity.

Alternatively, or in addition, the control signal can send a notification to operator 204 indicating the detected speed reduction and/or deterioration, providing a suggested corrective action, etc. This is represented by block 558. Such a notification can be sent to remote system 214 as well. This is represented by block 560. Of course, the machine action and corresponding control signal can be generated in other ways as well. This is represented by block 562.

Figure 9:
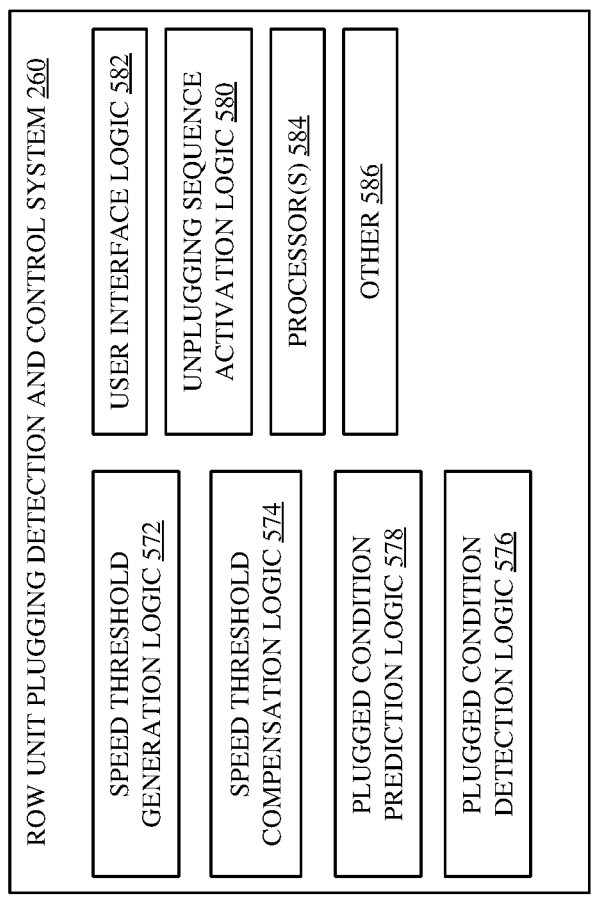
FIG. 9 is a block diagram of one example of a row unit plugging detection and control system.
Figures 1, 10:
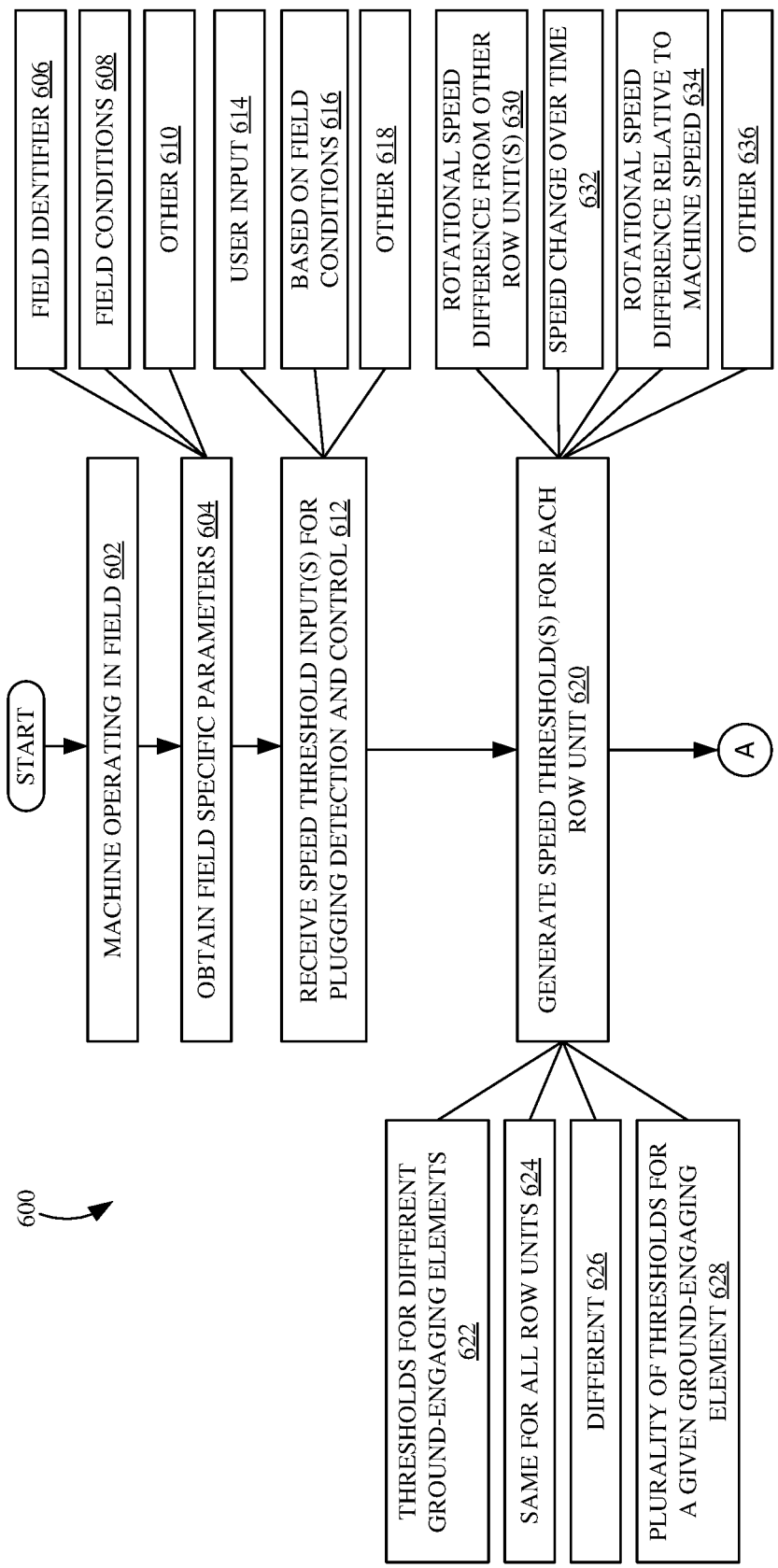
Figures 2, 10:
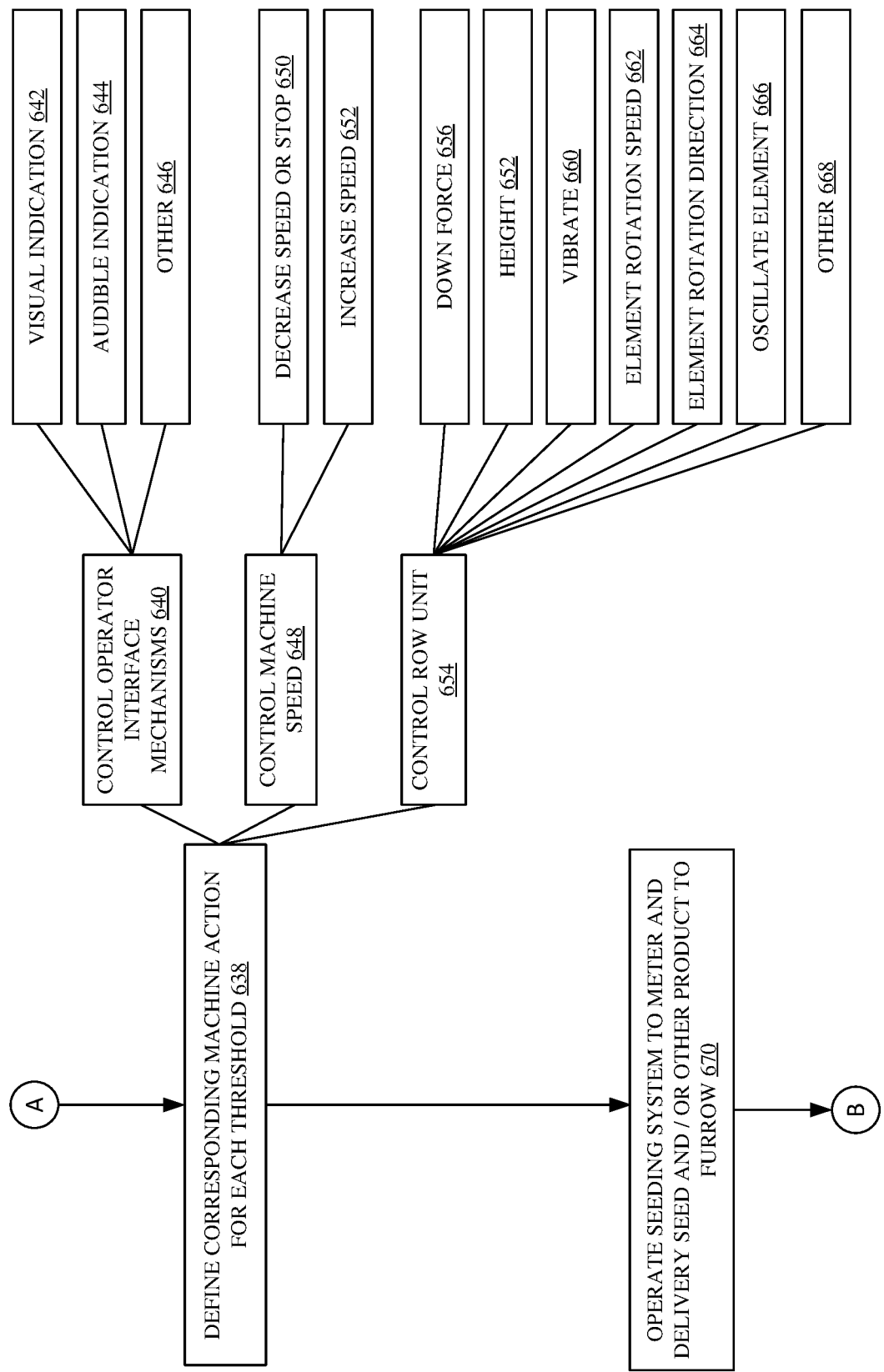
Figures 3, 10:
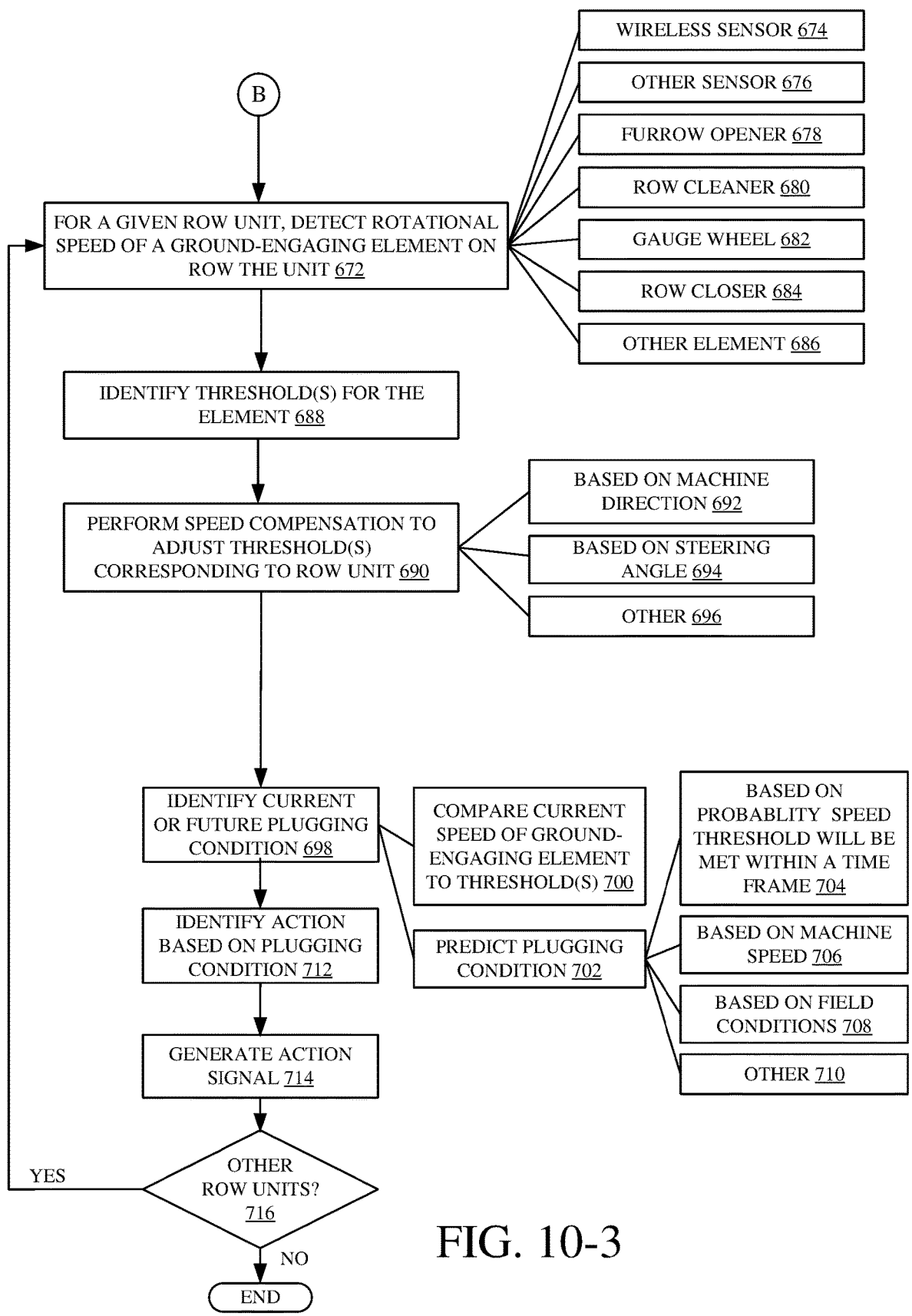

FIG. 9 is a block diagram illustrating one example of row unit plugging detection and control system 260. As shown in FIG. 9, control system 260 includes speed threshold generation logic 572, speed threshold compensation logic 574, plugged condition detection logic 576, plugged condition prediction logic 578, unplugging sequence activation logic 580, and user interface logic 582. Control system 260 can also include one or more processors 584 and other items 586 as well.

Speed threshold generation logic 572 is configured to generate speed thresholds for detecting or predicting plugged conditions on row units 110. As discussed in further detail below, a speed threshold can be generated in any of a number of ways. Further, the speed threshold can be predefined and/or dynamically adjusted during operation of planting machine 102.

For example, a speed threshold can be generated based on input from operator 204, input from another machine 212, and/or input from remote computing system 214. Alternatively, or in addition, a speed threshold can be generated based on a priori and/or in-situ data received by machine 102. For instance, the data can represent field conditions, such as moisture characteristics of the soil or any other characteristics associated with row unit plugging on machine 102.

Further, a speed threshold can be based on or correspond to any of a number of operational characteristics of planting machine 102. For instance, a speed threshold for a ground-engaging element on a row unit 110 can be defined relative to a reference speed. In one example, the reference speed includes a first or normal operating speed of the particular ground-engaging element, when the element is in an unplugged state. In another example, the reference speed is based on the same or similar ground-engaging element(s) on other row units (e.g., the speed of furrow openers 162 on adjacent row units 110, an average speed of furrow openers 162 across all row units 110, etc.). In another example, the reference speed is based on the field traversal speed of planting machine 102.

Speed threshold compensation logic 574 is configured to perform a compensation or adjustment of the speed thresholds based on the current operation of machine 102. For example, assume towing machine 104 is traveling at a particular speed (e.g., five miles per hour (mph)) and makes a right turn for a subsequent, parallel pass over the field. In this case, the ground-engaging elements on row units on the right side of planting machine 102 (i.e., the row units that are on the inside of the turn) will rotate more slowly than the ground-engaging elements on the left side of planting machine 102. Based on information that represents the speed and angle at which planting machine 102 is turning (such as GPS or heading data, steering or articulation angle data, etc.), compensation logic 574 temporarily adjusts the thresholds used to detect or predict plugging conditions.

Plugging condition detection logic 576 is configured to detect a plugging condition for any of row units 110 based on the speed thresholds generated by logic 572, and any compensation performed by compensation logic 574. Illustratively, a plugging condition is detected when a speed threshold is reached (e.g., the rotational speed of a ground-engaging element falls below the speed threshold). This can include situations in which a ground-engaging element ceases rotation or is rotating at a relatively low speed.

Plugged condition prediction logic 578 is configured to predict the occurrence of a plugged condition. That is, while row units 110 of planting machine 102 are not currently experiencing a plugging condition (i.e., the speed thresholds have not been reached), logic 578 is configured to determine that a speed threshold is likely to be reached within a time period. The prediction can be based on the current rotational speed of a ground-engaging element on a row unit 110 and a predicted change to the rotational speed, for example based on field conditions identified by control system 260.

Unplugging sequence activation logic 580 is configured to activate an unplugging sequence. Examples of actions that can be performed by machine 102 are described in further detail below. Briefly, logic 580 is configured to control subsystems 202 to perform actions that encourage removal of the field residue to remedy or address a detected or predicted plugged condition.

User interface logic 582 is configured to provide or control user interfaces. For example, this can include operator interface mechanisms 208, as well as user interfaces associated with other machines 212 or remote computing system 214. User interface logic 582 is configured to render outputs (which can be visual, audible, or other outputs) that indicate the operation of machine 102 and the detection or prediction of plugged conditions. Also, through these interfaces, operator 204, or other user, can provide inputs to control unplugging sequence activation logic 580, or other components of architecture 200 to perform actions to address the detected or predicted plugged condition.

FIGS. 10-1, 10-2, and 10-3 (collectively referred to as FIG. 10) are a flow diagram illustrating an example operation of an agricultural machine to detect a plugging condition and control the machine to perform a corresponding action. For sake of illustration, but not by limitation, FIG. 10 will be described in the context of plugging detection and control system 260 illustrated in FIG. 9.

At block 602, planting machine 102 is operating in a field. Field specific parameters can be obtained at block 604. For example, the field specific parameters can include a field identifier, represented at block 606, that identifies the field in which the machine is operating. Field conditions can include soil conditions, such as soil type, soil moisture, etc. The field conditions can be obtained from prior machine operation in the field, from sensors on or associated with planting machine 102, or otherwise. Accordingly, a priori and/or in-situ data can be obtained representing the field specific parameters. Of course, other parameters can be obtained as well, as represented at block 610.

At block 612, input for defining speed thresholds for plugging detection and control are received. These inputs can be received in any of a number of ways. For instance, as represented at block 614, these inputs can include input received from operator 204 or another user. Also, as noted above, inputs for defining speed thresholds can be received from another machine or system (e.g., machine 212, remote computing system 214, etc.).

For example, operator 204 can select or otherwise define speed thresholds for particular row units, or particular ground-engaging elements on the row units, through operator interface 206. This, of course, is for sake of example only. Further, as represented at block 616, speed threshold inputs can include, or be based upon, the field conditions obtained at block 608. Of course, speed threshold inputs can be received in other ways as well, as represented by block 618.

At block 620, one or more speed thresholds are generated. When row units 110 have a plurality of different ground-engaging elements (e.g., furrow opener, row cleaner, gauge wheel, a row closer, etc.), a number of thresholds can be generated for different elements. This is represented by block 622. For example, one or more thresholds can be generated for furrow opener 162 and one or more speed thresholds can be generated for row cleaner 160.

The speed thresholds can be the same across all row units 110 (block 624), or different thresholds can be generated for individual row units (block 626). Also, a plurality of thresholds can be generated for a given ground-engaging element. This is represented by block 628. For example, first and second speed thresholds can be generated for furrow opener 162. As discussed below, each of these speed thresholds can have a different corresponding machine action that is performed when the respective speed threshold is reached.

A speed threshold for a particular ground-engaging element on a row unit 110 can be defined as a difference relative to a first or reference speed. To illustrate, in one example, a speed threshold for furrow opener 162 (or other ground-engaging element) is ninety percent of the reference speed. In another example, the speed threshold is seventy five percent of the reference speed. In another example, the speed threshold is sixty percent of the reference speed. In another example, the speed threshold is fifty percent of the reference speed. In another example, the speed threshold is twenty five percent of the reference speed. In another example, the speed threshold is ten percent of the reference speed. These, of course, are for sake of example only.

Further, the reference speed can be based on, or correlated to, any number of operational characteristics of planting machine 102. For example, the reference speed can include a first or normal operating speed of the particular ground-engaging element, when the element is in an unplugged state. In another example, the reference speed is based on the same or similar ground-engaging element(s) on other row units (e.g., the speed of furrow openers 162 on adjacent row units 110, an average speed of furrow openers 162 across all row units 110, etc.). In another example, the reference speed is based on the field traversal speed of planting machine 102.

Accordingly, as represented at block 630, an example speed threshold represents a difference of the rotational speed, in terms of revolutions per minute (rpm)), of a given ground-engaging element on one row unit 110 compared to the rotational speed of the same ground-engaging element on other row unit(s) (e.g., one or more adjacent row units, all row units, etc.). To illustrate, an example speed threshold for a first furrow opener on a first row unit is met when the rotational speed of the first furrow opener falls below fifty percent of the average rotational speed of all furrow openers on planting machine 102.

Also, as represented at block 632, a speed threshold can be defined in terms of a reduction in rotational speed of a ground-engaging element over a particular time frame. To illustrate, an example speed threshold for a first furrow opener on a first row unit is met when the rotational speed of the first furrow opener falls by twenty percent within a ten minute time window.

Further, as represented at block 634, a speed threshold can be based on the traversal speed of planting machine 102 over the field. For example, the rotational speed of furrow opener 162 can be converted to a representation of a linear speed, i.e., based on the angular velocity and radius of furrow opener 162. This linear speed representation is compared to the traversal speed of planting machine 102 over the field (e.g., the detected speed of towing machine 104), to determine whether the rotational speed has fallen below the speed threshold.

Of course, speed thresholds can be generated in other ways as well. This is represented by block 636.

At block 638, a corresponding machine action is defined for each threshold generated at block 620. The machine action is performed by control system 12 when the threshold is met.

In one example, as represented at block 640, the machine action includes controlling operator interface mechanisms 208 to provide an indication of the operation of the machine. Examples include providing an indication that a plugging condition has been detected or predicted, or other indication that a corresponding threshold has been met. For instance, a visual indication (block 642) and/or audible indication (block 644) can be provided to operator 204 indicating the detection of a plugging condition. The indication can identify the particular row unit, the particular ground-engaging element, the severity of the plugging condition, or any of a wide variety of other information. Alternatively, or in addition, an indication of the rotational speed, relative to the threshold, can be provided to operator 204. Also, a suggested unplugging action can be provided to operator 204. For example, a recommended change to the machine speed, a change to a configuration of the row unit, etc. can be provide to operator 204. Operator interface mechanisms 208 can be controlled in other ways as well, as represented at block 646.

At block 648, the machine action can include controlling the speed of planting machine 102 over the field. For instance, the machine action can decrease the speed of towing machine 104, as represented at block 650. In another example, the machine speed can be increased, as indicated at block 652.

Also, the machine action can include controlling the row unit, corresponding to the plugging condition. This is represented at block 654. For example, the downforce applied by downforce generator 170 can be adjusted, as represented at block 656. For instance, the downforce can be increased for a predefined period of time, upon which the downforce is decreased and the rotational speed redetected to determine whether the plugging condition has been resolved.

In another example, the height of the ground-engaging element can be adjusted at block 658. This can include raising and lowering the element relative to the row unit, or raising or lowering the row unit itself.

Also, the ground-engaging element can be vibrated or shaken at block 660, to encourage removal of the plugging condition from the ground-engaging element. For example, actuator configured to raise and lower row unit 110 relative to the frame 108 of planting machine 102 can be controlled to cause a vertical oscillation of the row unit.

Also, the rotational speed of the ground-engaging element can be controlled at block 662. For example, the rotational speed of the ground-engaging element can be increased by activating, or otherwise controlling, drive mechanism 262 to rotate the element in the forward direction, corresponding to the direction of travel of planting machine 102. Block 662 can also include rotating the element at a speed that is greater than the speed at which machine 102 is traversing the field. Also, the rotational direction of the element can be changed, as indicated at block 664. For example, drive mechanism 262 can be controlled to reverse the direction of rotation of the ground-engaging element that is experiencing the plugging condition. The element can be rotated in the reverse direction for a period of time, upon which drive mechanism 262 is deactivated or controlled to rotate the element in the forward direction for a second period of time.

Also, the element can be oscillated, as represented at block 666. For example, if furrow opener 162 is experiencing a plugging condition (e.g., a particular threshold has been met), then row unit 110 can be raised and drive mechanism 262 controlled to oscillate furrow opener 162 for a period of time, upon which row unit 110 is lowered to reengage furrow opener 162 with the ground. Of course, the row unit can be controlled in other ways as well, as represented at block 668.

At block 670, the seeding system on the row unit is operated to meter and deliver seed and/or other product, such as fertilizer, to the furrow formed in the field. At block 672, the rotational speed of ground-engaging element on a given row unit is detected. As mentioned above, the rotational speed can be detected in any of a number of ways. For example, a wireless sensor can be utilized, as represented by block 674. As noted above with respect to FIG. 4, system 240 can receive signals from a motion sensor and/or RFID tag on, or otherwise associated with, a ground-engaging element. Of course, other sensors can be utilized as well, as represented at block 676. For example, a magnetic or optical sensor can be positioned on the row unit, proximate the ground-engaging element, and configured to generate a sensor signal indicative of the rotation of the element.

Again, the ground-engaging element can include any of a number of different types of rotational elements on the row unit. As noted above, this can include a furrow opener (block 678), row cleaner (block 680), a gauge wheel (block 682), a row closer (block 684), or other element (block 686). At block 688, speed thresholds for the ground-engaging elements are identified. For example, the thresholds generated at block 620 can be stored in data store 224, and retrieved by control system 260.

At block 690, speed compensation is performed to adjust the threshold(s). As noted above, an example speed compensation can be based on a detected direction of the machine over the field (block 692), a steering angle (block 694), or other ways (block 696).

To illustrate, speed compensation performed at block 690 is based on an angle or turn radius of planting machine 102, which indicates a rotational speed differential across the row units. For example, based on the turn radius of planting machine 102, block 690 can determine that the furrow opener on a first row unit position on the outer edge of the turn radius will rotate approximately twice as fast as the furrow opener on a second row unit positioned on the inner edge of planting machine 102. Adjustments to the thresholds of those row units are made by speed threshold compensation logic 574.

At block 698, a plugging condition is identified. As noted above, this can include a detection of a current plugging condition, that is detected based on a speed threshold being met for a current rotational speed. Here, the current speed of the ground-engaging element is compared to the threshold(s) corresponding to the ground-engaging element being sensed, as represented at block 700. In another example, as represented at block 702, a future plugging condition is predicted, indicating that the ground-engaging element will likely experience a plugging condition within a period of time. For instance, the prediction is based on a determined probability that the speed threshold will be met within a particular time frame, as represented at block 704. The probability can be further based on the current or future expected speed of planting machine 102, as represented at block 706. Alternatively, or in addition, the plugging condition prediction can be based on the field conditions, as represented at block 708. For example, the likelihood of a plugging condition can increase for higher soil moisture or different soil types.

Of course, plugging conditions can be determined in other ways as well, as represented at block 710. At block 712, based on the plugging condition identified at block 698 (e.g., which speed threshold was met), the machine action corresponding to that plugging condition or speed threshold is identified. For example, an indication of the machine actions can be stored in data store 224 along with the speed thresholds. For example, a lookup table can map machine actions to the corresponding speed thresholds.

At block 714, control system 120 generates an action signal corresponding to the identified action. For example, the action signal is configured to control controllable subsystems 202 to execute the machine action(s). At block 716, plugging conditions for other row units are detected.

Figure 11:
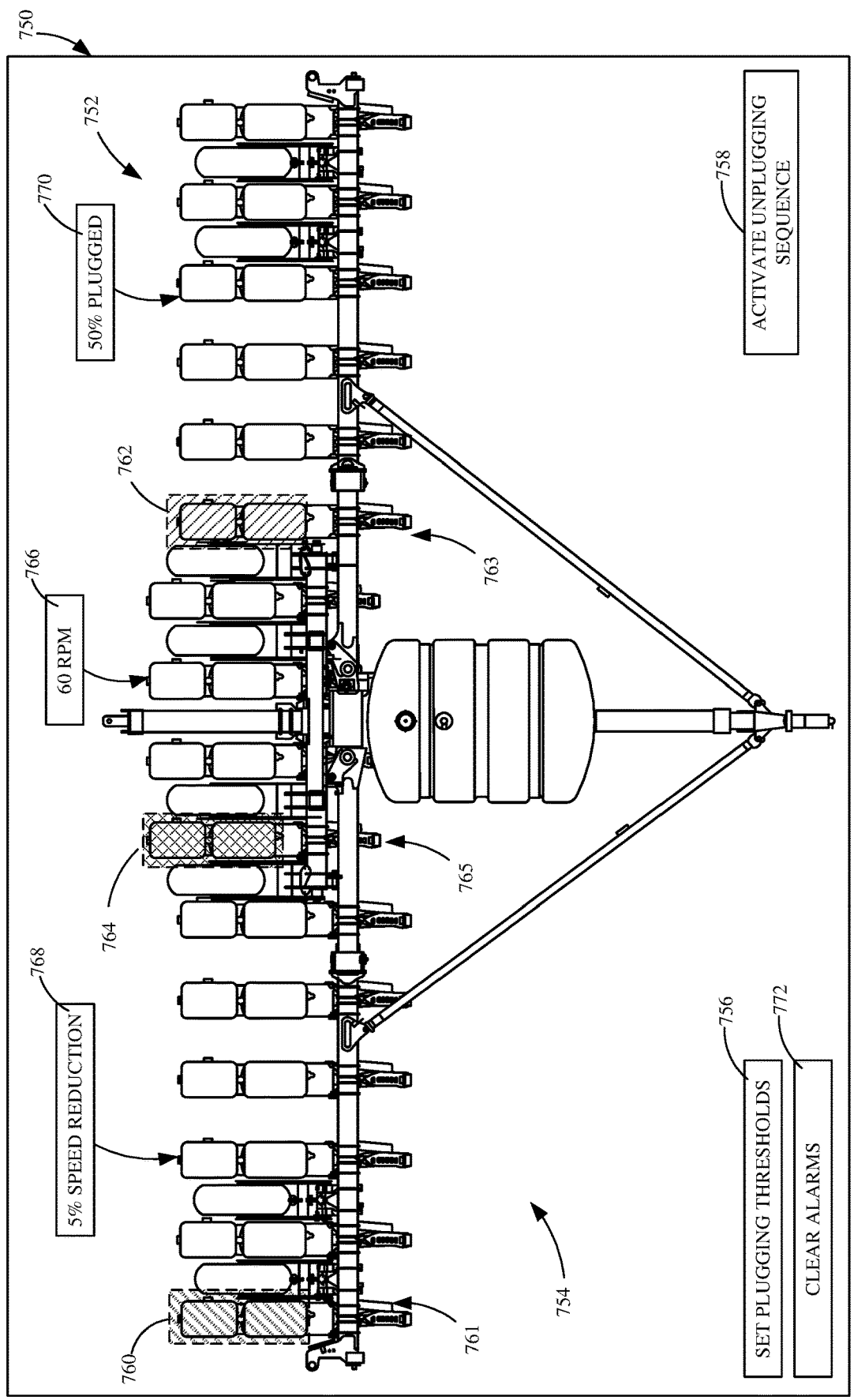
FIG. 11 illustrates an example user interface display.

FIG. 11 illustrates an example of user interface display 750 that can be provided to operator 204 as operator interface 206. Also, user interface display 750 can be provided to another user, such as remote user 218.

As shown in FIG. 11, display 750 includes a visualization 752 representing the current planting machine 102. Visualization 752 can be specific to the planting machine 102. For example, wireless machine component detection and processing system 240 can automatically detect the type of planting machine 102 coupled to towing machine 104, and user interface logic 582 can render visualization 752 based on the detected type.

In any case, visualization 752 includes a representation 754 of the plurality of row units 110 on the planting machine. Display 750 includes a set of user input mechanisms that are actuatable by operator 204. For example, a threshold setting user input mechanism 756 is actuatable by operator 204 to set the speed thresholds for particular row units, as well as particular ground-engaging elements on those row units to be utilized in the plugging detection and control. Display 750 can also include a machine control user input mechanism 758 that is actuatable to activate an unplugging sequence, such as that described above with respect to block 638. For example, actuation of input mechanism 758 can initiate an automated or semi-automated, machine control sequence that operates row unit(s) on machine 102 to rectify plugging condition. User interface display 750 is configured to display a visual indication, for each row unit, indicating a current plugged or unplugged state. For instance, the visualization can identify which row units have satisfied one of the defined speed thresholds. Further, in the case of multiple thresholds, the visualization can indicate which of the speed thresholds is currently satisfied.

To illustrate, assume that two speed thresholds for furrow opener 162 have been defined. The first speed threshold corresponds to a twenty percent decrease in speed of a particular furrow opener 162, relative to the average speed of the furrow openers 162 across all row units. The second speed threshold indicates a fifty percent reduction, relative to the average speed. Each of these thresholds can have different corresponding action. For example, a first visualization 760 indicates that the first threshold has been met for row unit 761 identified by the visualization 760. A second visualization 762, that is different than the first visualization 760, indicates that the second threshold has been met for row unit 763. A third visualization 764, that is different than the first visualization 760 and the second visualization 762, indicates that the third threshold has been met for row unit 765. In one example, visualizations 760, 762, and 764 form a heat-map that color-codes (or otherwise highlights or visualizes) the current plugging states of the row units. For instance, row units that have a speed in which the first threshold is not met are highlighted in green. Row units that have a speed that has been reduced such that the first threshold is satisfied, but the second threshold is not satisfied, are highlighted in yellow. Row units that have a speed that has been reduced such that second threshold is satisfied, are highlighted in red. This allows operator 204 to quickly identify the speeds and plugins states of the row units without diverting a significate amount of attention away from the operation.

Also, display 750 can include metrics that provide an indication of the current speed of each row unit. For instance, a display element 766 can indicate the current speed of the furrow opener 162 on a row unit in terms of rpms. In another example, a display element 768 can provide a metric in terms of a reduction in speed from the normal or unplugged state. Alternatively, or in addition, a display element 770 can provide a metric in terms of progress towards the plugged state. User input mechanism 772 can be provided and actuated by operator 204 to clear the alert or alarms provided on user interface display 750. In addition to providing visual alerts or alarms, audible alerts or alarms can be provided as well.

It can thus be seen that the present system provides a number of advantages. For example, but not by limitation, a control system for a row unit on a planning machine monitors the rotational speed of ground-engaging elements to determine whether a plugging condition occurs, upon which a control system controls the machine to perform an action based on the plugging condition. This can alert the operator of an otherwise undetected plugging condition, or facilitate earlier detection of plugging conditions. This can increase planter uptime and reduce operator time expended in cleaning row units. Additionally, reduction in plugging conditions can improve row unit performance to increase yield, increase machine efficiency, decrease fuel consumption, etc.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors, processing systems, controllers and/or servers. In one example, these can include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 12:
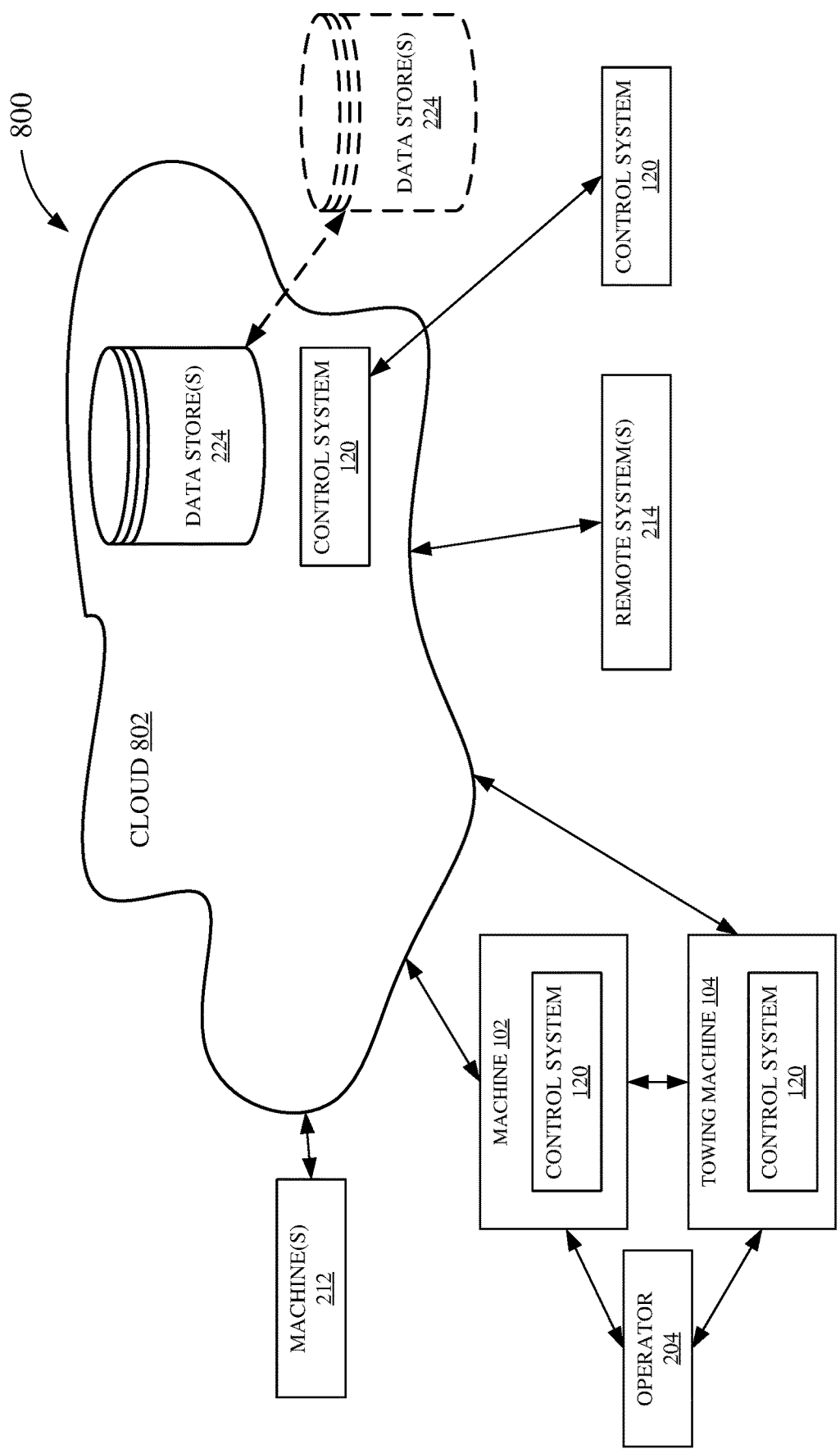
FIG. 12 is a block diagram showing one example of the architecture illustrated in FIG. 3, deployed in a remote server architecture.

FIG. 12 is a block diagram of one example of agricultural machine architecture 200, shown in FIG. 3, where planting machine 102 communicates with elements in a remote server architecture 800. In an example, remote server architecture 800 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 3 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 12, some items are similar to those shown in FIG. 3 and they are similarly numbered. FIG. 12 specifically shows that system 120 and/or data store 224 can be located at a remote server location 882. Therefore, planting machine 102 accesses those systems through remote server location 882.

FIG. 12 also depicts another example of a remote server architecture. FIG. 12 shows that it is also contemplated that some elements of FIG. 3 are disposed at remote server location 802 while others are not. By way of example, data store 224 can be disposed at a location separate from location 802, and accessed through the remote server at location 802. Alternatively, or in addition, system 120 can be disposed at location(s) separate from location 802, and accessed through the remote server at location 802.

Regardless of where they are located, they can be accessed directly by planting machine 102, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the planting machine comes close to the fuel truck for fueling, the system automatically collects the information from the machine or transfers information to the machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the planting machine until the planting machine enters a covered location. The planting machine, itself, can then send and receive the information to/from the main network.

It will also be noted that the elements of FIG. 3, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 13:
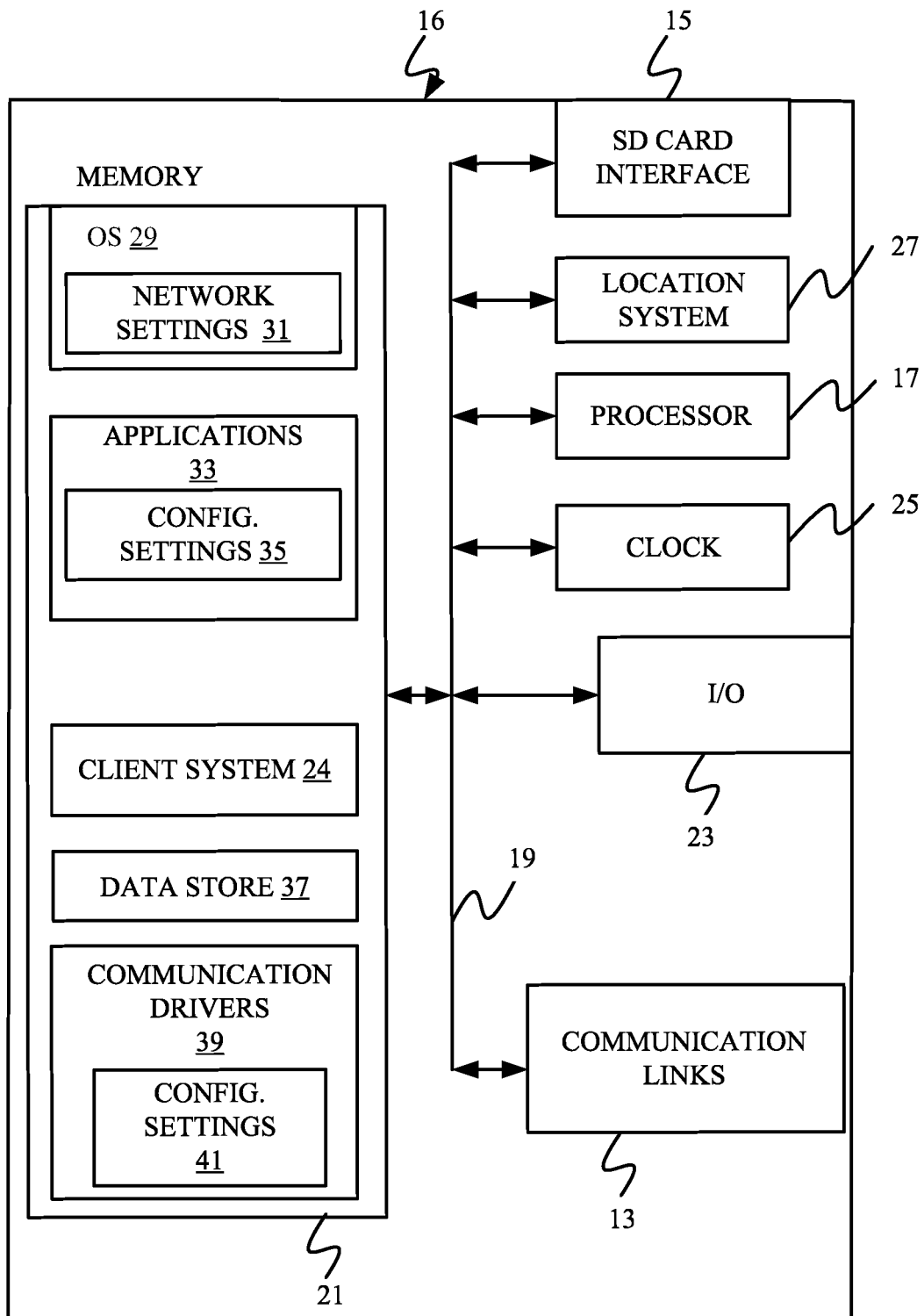
FIGS. 13-15 show examples of mobile devices that can be used in the architectures shown in the previous figures.
Figure 14:
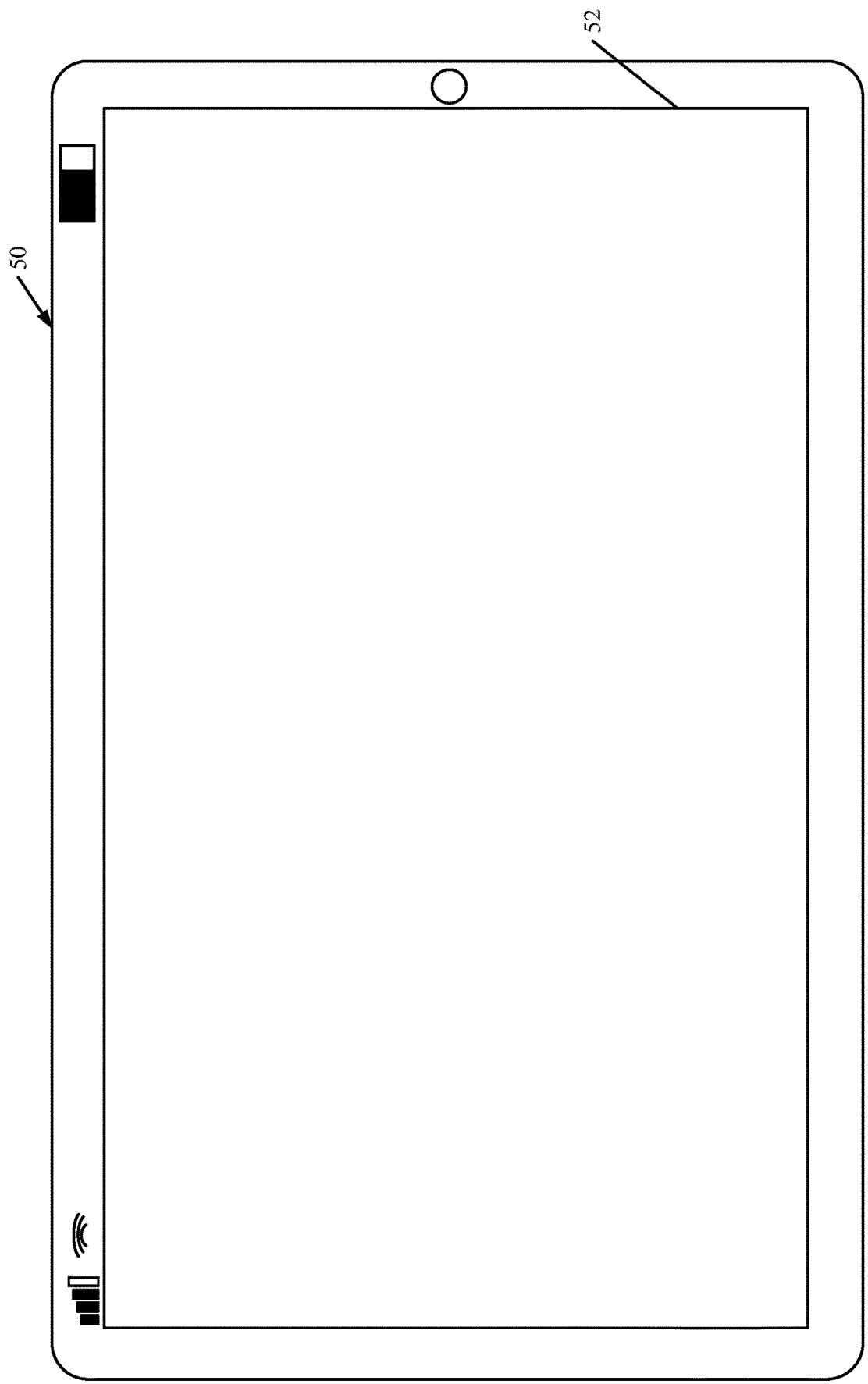
Figure 15:
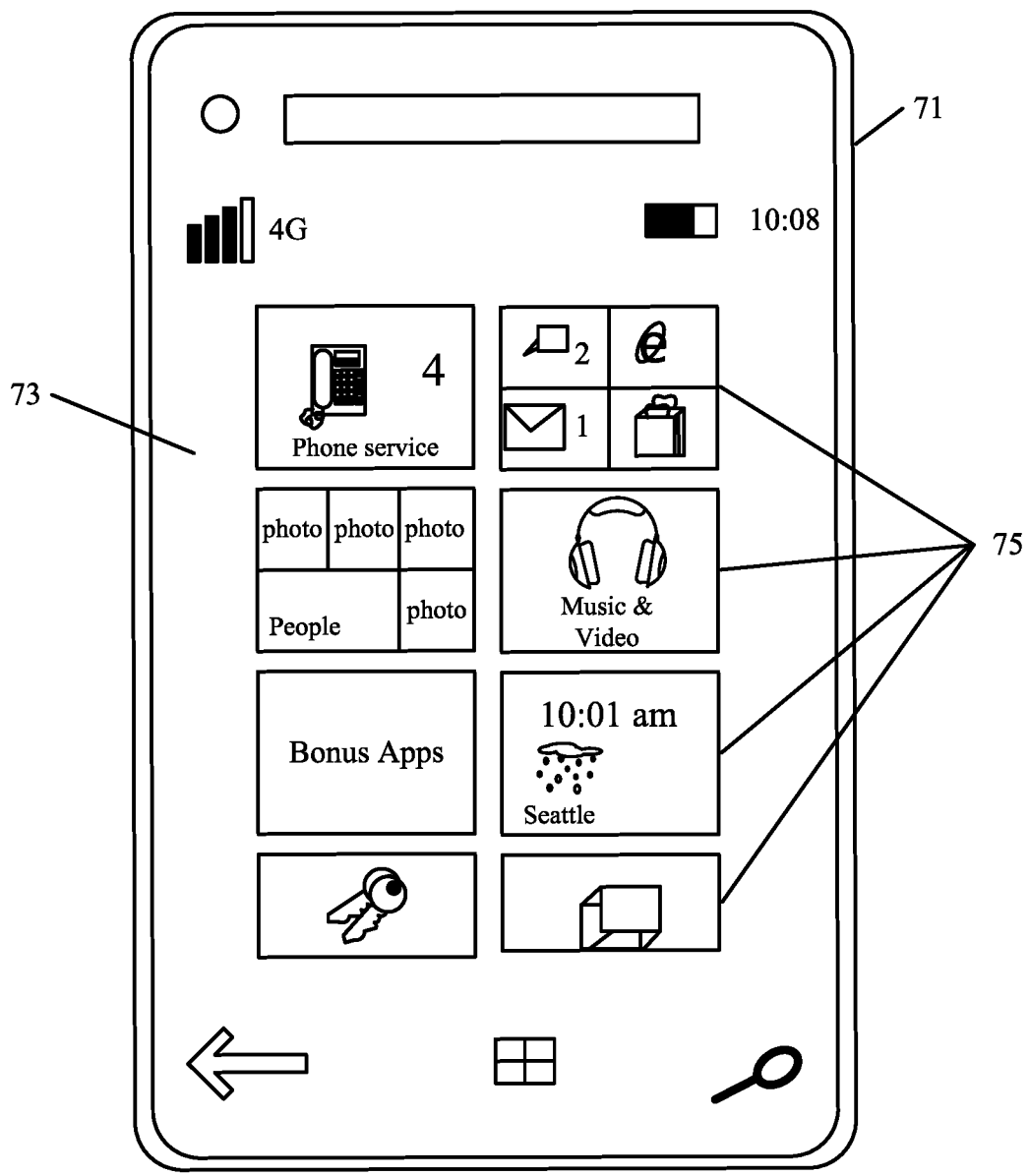

FIG. 13 is a simplified block diagram of one illustrative example of a handheld or mobile computing device that can be used as a user's or client's handheld device 16, in which the present system (or parts of it) can be deployed. For instance, a mobile device can be deployed in the operator compartment of towing machine 104 or as remote computing system 214. FIGS. 14-15 are examples of handheld or mobile devices.

FIG. 13 provides a general block diagram of the components of a client device 16 that can run some components shown in FIG. 3, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 14 shows one example in which device 16 is a tablet computer 50. In FIG. 14, computer 50 is shown with user interface display screen 52. Screen 52 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 50 can also illustratively receive voice inputs as well.

FIG. 15 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 16:
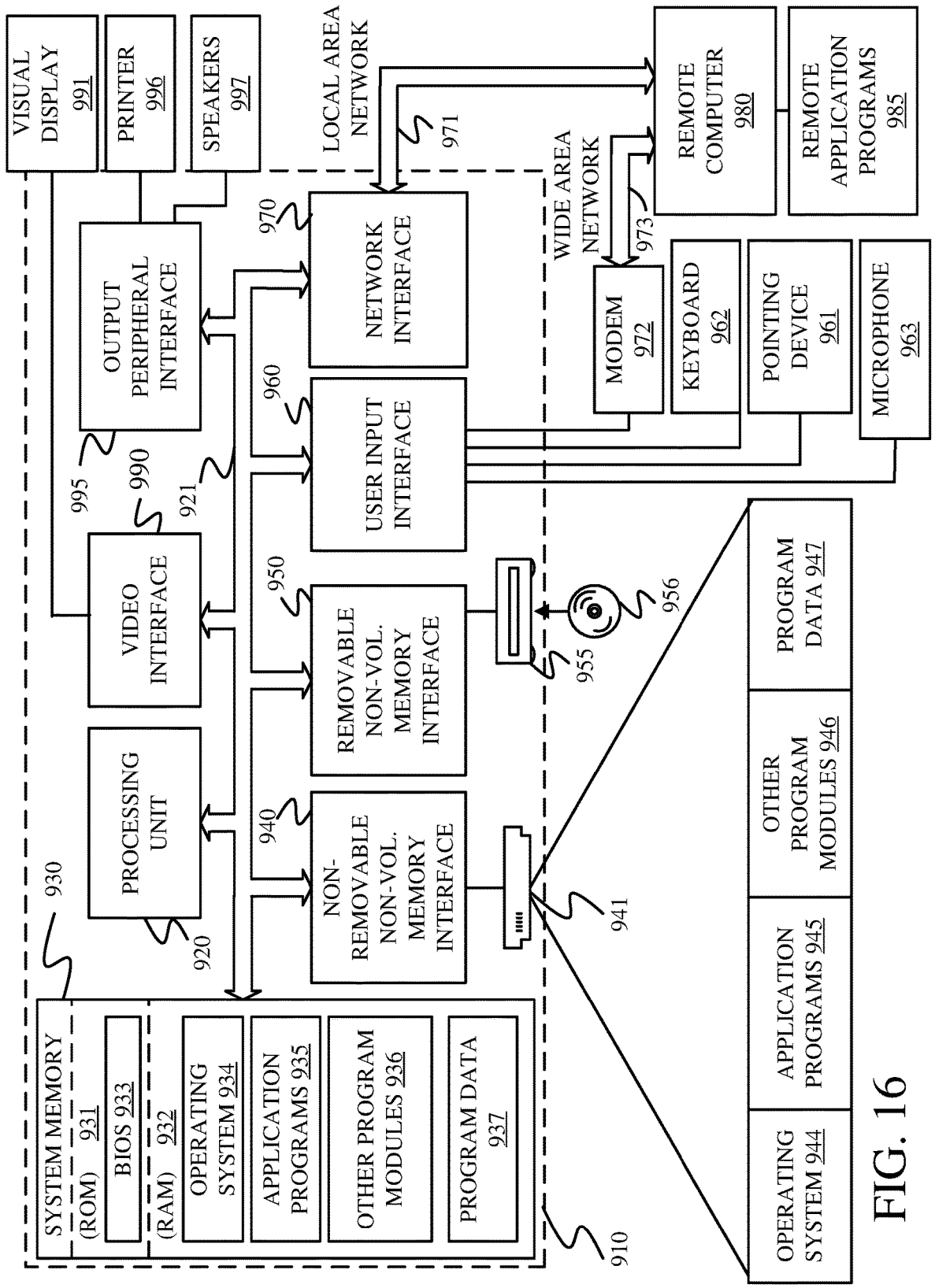
FIG. 16 is a block diagram showing one example of a computing environment that can be used in the architectures shown in the previous figures.

FIG. 16 is one example of a computing environment in which elements of FIG. 3, or parts of it, (for example) can be deployed. With reference to FIG. 16, an example system for implementing some embodiments includes a computing device in the form of a computer 910. Components of computer 910 may include, but are not limited to, a processing unit 920 (which can comprise processors or servers from previous FIGS.), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. Memory and programs described with respect to FIG. 3 can be deployed in corresponding portions of FIG. 16.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 930 includes computer storage media in the form of volatile and/or nonvolatile memory such as read only memory (ROM) 931 and random-access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 16 illustrates operating system 934, application programs 935, other program modules 936, and program data 937.

The computer 910 may also include other removable/non-removable volatile/nonvolatile computer storage media. By way of example only, FIG. 16 illustrates a hard disk drive 941 that reads from or writes to non-removable, nonvolatile magnetic media, an optical disk drive 955, and nonvolatile optical disk 956. The hard disk drive 941 is typically connected to the system bus 921 through a non-removable memory interface such as interface 940, and optical disk drive 955 is typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 16, provide storage of computer readable instructions, data structures, program modules and other data for the computer 910. In FIG. 16, for example, hard disk drive 941 is illustrated as storing operating system 944, application programs 945, other program modules 946, and program data 947. Note that these components can either be the same as or different from operating system 934, application programs 935, other program modules 936, and program data 937.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures. A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections (such as a local area network—LAN, or wide area network—WAN or a controller area network—CAN) to one or more remote computers, such as a remote computer 980.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. In a networked environment, program modules may be stored in a remote memory storage device. FIG. 16 illustrates, for example, that remote application programs 985 can reside on remote computer 980.

It should also be noted that the different examples described herein can be combined in different ways. That is, parts of one or more examples can be combined with parts of one or more other examples. All of this is contemplated herein.

Example 1 is a method of controlling a mobile agricultural machine, the method comprising:
operating a row unit having a ground-engaging element to deliver product to a furrow formed by the row unit;
receiving an indication of rotational speed of the ground-engaging element;
determining that the rotational speed of the ground-engaging element is below a threshold; and
controlling an action of the mobile agricultural machine based on the determination.

Example 2 is the method of any or all previous examples, wherein receiving an indication of rotational speed of the ground-engaging element comprises receiving a sensor signal from a sensor on the row unit.

Example 3 is the method of any or all previous examples, wherein the ground-engaging element comprises a furrow opener mounted to the row unit and configured to engage a surface of ground over which the mobile agricultural machine travels to open the furrow in the ground.

Example 4 is the method of any or all previous examples, wherein the row unit comprises a furrow opener mounted to the row unit and configured to engage a surface of ground over which the mobile agricultural machine travels to open the furrow in the ground, and wherein the ground-engaging element comprises at least one of:
a row cleaner mounted to the row unit ahead of the furrow opener relative to a direction of travel of the mobile agricultural machine, the row cleaner configured to clear debris from a path of the furrow opener;
a furrow closer mounted to the row unit behind the furrow opener relative to a direction of travel of the mobile agricultural machine; or
a gauge wheel.

Example 5 is the method of any or all previous examples, and further comprising identifying a plugging condition based on the determination Example 6 is the method of any or all previous examples, wherein controlling an action of the mobile agricultural machine comprises controlling a user interface device to render the indication of rotation of the ground-engaging element.

Example 7 is the method of any or all previous examples, wherein controlling an action of the mobile agricultural machine comprises:
controlling a speed of the mobile agricultural machine.

Example 8 is the method of any or all previous examples, wherein controlling an action of the mobile agricultural machine comprises:
controlling operation of the row unit.

Example 9 is the method of any or all previous examples, wherein controlling operation of the row unit comprises at least one of:
adjusting a downforce exerted on the row unit by a downforce generation subsystem,
adjusting a height of the ground-engaging element, and
controlling an actuator to vibrate the row unit.

Example 10 is the method of any or all previous examples, wherein controlling an action of the mobile agricultural machine comprises:
controlling the ground-engaging element.

Example 11 is the method of any or all previous examples, wherein controlling operation of the row unit comprises at least one of:
controlling a rotational speed of the ground-engaging element,
controlling a rotational direction of the ground-engaging element, or
oscillating the ground-engaging element.

Example 12 is the method of any or all previous examples, and further comprising:
defining a plurality of thresholds associated with the ground-engaging element; and
associating a machine action with each threshold of the plurality of thresholds.

Example 13 a mobile agricultural machine comprising:
a row unit comprising:
a product delivery system configured to deliver product to a furrow; and
a ground-engaging element configured to rotate about an axis; and
a control system configured to:
receive an indication of rotation of the ground-engaging element; and
generate an action signal to control an action of the mobile agricultural machine based on the indication of rotation of the ground-engaging element.

Example 14 is the mobile agricultural machine of any or all previous examples, wherein the ground-engaging element comprises a furrow opener mounted to the row unit and configured to engage a surface of ground over which the mobile agricultural machine travels to open the furrow in the ground.

Example 15 is the mobile agricultural machine of any or all previous examples, wherein the row unit comprises a furrow opener mounted to the row unit and configured to engage a surface of ground over which the mobile agricultural machine travels to open the furrow in the ground, and wherein the ground-engaging element comprises at least one of:

a row cleaner mounted to the row unit ahead of the furrow opener relative to a direction of travel of the mobile agricultural machine, the row cleaner configured to clear debris from a path of the furrow opener;

a furrow closer mounted to the row unit behind the furrow opener relative to a direction of travel of the mobile agricultural machine; or a gauge wheel.

Example 16 is the mobile agricultural machine of any or all previous examples, and further comprising:

a user interface device; and wherein the action signal controls the user interface device to render the indication of rotation of the ground-engaging element to a user.

Example 17 is the mobile agricultural machine of any or all previous examples, wherein the mobile agricultural machine is controlled to at least one of:

adjust a downforce exerted on the row unit by a downforce generation subsystem, adjust a height of the ground-engaging element, or control an actuator to vibrate the row unit.

Example 18 is the mobile agricultural machine of any or all previous examples, wherein the mobile agricultural machine is controlled to at least one of:

control a rotational speed of the ground-engaging element, control a rotational direction of the ground-engaging element, or oscillate the ground-engaging element.

Example 19 is a method of controlling a mobile agricultural machine, wherein the control system is configured to:

define a plurality of thresholds associated with the ground-engaging element; and associate a machine action with each threshold of the plurality of thresholds.

Example 20 is a method of controlling a mobile agricultural machine, the method comprising:

operating a row unit having a ground-engaging element to deliver product to a furrow formed by the row unit;

receiving an indication of rotational speed of the ground-engaging element;

determining that the rotational speed of the ground-engaging element is below a threshold;

identifying a predicted plugging condition based on the determined rotational speed; and controlling an action of the mobile agricultural machine based on the predicted plugging condition.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of controlling a mobile agricultural machine, the method comprising:

operating a row unit having a ground-engaging element and configured to deliver product to a furrow formed by the row unit;

receiving an indication of rotational speed of the ground-engaging element;

performing a comparison of the rotational speed of the ground-engaging element to a plurality of rotational speed thresholds, each rotational speed threshold, of the plurality of rotational speed thresholds, having a different associated machine action;

based on the comparison, selecting a machine action that is associated with a particular rotational speed threshold, of the plurality of rotational speed thresholds, that corresponds to the rotational speed of the ground-engaging element; and controlling the mobile agricultural machine to perform the machine action.

2. The method of claim 1, wherein receiving an indication of rotational speed of the ground-engaging element comprises receiving a sensor signal from a sensor on the row unit.

3. The method of claim 1, wherein the ground-engaging element comprises a furrow opener mounted to the row unit and configured to engage a surface of ground over which the mobile agricultural machine travels to open the furrow in the ground.

4. The method of claim 1, wherein the row unit comprises a furrow opener mounted to the row unit and configured to engage a surface of ground over which the mobile agricultural machine travels to open the furrow in the ground, and wherein the ground-engaging element comprises at least one of:

a row cleaner mounted to the row unit ahead of the furrow opener relative to a direction of travel of the mobile agricultural machine, the row cleaner configured to clear debris from a path of the furrow opener;

a furrow closer mounted to the row unit behind the furrow opener relative to a direction of travel of the mobile agricultural machine; or a gauge wheel.

5. The method of claim 1, and further comprising identifying a plugging condition based on the comparison.

6. The method of claim 1, wherein the machine action comprises controlling a user interface device to render the indication of rotation of the ground-engaging element.

7. The method of claim 1, wherein the machine action comprises:

controlling a speed of the mobile agricultural machine.

8. The method of claim 1, wherein the machine action comprises;

controlling operation of the row unit.

9. The method of claim 8, wherein controlling operation of the row unit comprises at least one of:

adjusting a downforce exerted on the row unit by a downforce generation subsystem, or adjusting a height of the ground-engaging element.

10. The method of claim 8, wherein the machine action comprises controlling an actuator to vibrate the row unit.

11. The method of claim 8, wherein controlling operation of the row unit comprises controlling a drive mechanism on the row unit configured to drive rotation of the ground-engaging element, wherein the drive mechanism is controlled to at least one of:

control a rotational speed of the ground-engaging element, control a rotational direction of the ground-engaging element, or oscillate rotation of the ground-engaging element.

12. A method of controlling a mobile agricultural machine, the method comprising:

operating a row unit having a ground-engaging element to deliver product to a furrow formed by the row unit;

receiving an indication of rotational speed of the ground-engaging element;

generating a likelihood that the rotational speed of the ground-engaging element will meet a threshold rotation speed within a time period based on a field condition;

identifying a predicted plugging condition based on the likelihood; and controlling an action of the mobile agricultural machine based on the predicted plugging condition.

13. The method of claim 12, wherein controlling the action comprises controlling an actuator on the row unit to at least one of:

oscillate rotation of the ground-engaging element, or vibrate the row unit.

14. A mobile agricultural machine comprising:

a row unit configured to deliver product to a furrow, the row unit comprising a ground-engaging element configured to rotate about an axis of the ground-engaging element; and a control system configured to:

receive an indication of rotational speed of the ground-engaging element;

perform a comparison of the rotational speed of the ground-engaging element to a plurality of rotational speed thresholds, each rotational speed threshold, of the plurality of rotational speed thresholds, having a different associated machine action;

based on the comparison, select a machine action that is associated with a particular rotational speed threshold, of the plurality of rotational speed thresholds, that corresponds to the rotational speed of the ground-engaging element; and control the mobile agricultural machine to perform the machine action.

15. The mobile agricultural machine of claim 14, wherein the ground-engaging element comprises a furrow opener mounted to the row unit and configured to engage a surface of ground over which the mobile agricultural machine travels to open the furrow in the ground.

16. The mobile agricultural machine of claim 14, wherein the row unit comprises a furrow opener mounted to the row unit and configured to engage a surface of ground over which the mobile agricultural machine travels to open the furrow in the ground, and wherein the ground-engaging element comprises at least one of:

a row cleaner mounted to the row unit ahead of the furrow opener relative to a direction of travel of the mobile agricultural machine, the row cleaner configured to clear debris from a path of the furrow opener;

a furrow closer mounted to the row unit behind the furrow opener relative to a direction of travel of the mobile agricultural machine; or a gauge wheel.

17. The mobile agricultural machine of claim 14, and further comprising:

a user interface device; and wherein the machine action controls the user interface device to render, to a user, the indication of rotation of the ground-engaging element.

18. The mobile agricultural machine of claim 14, wherein the mobile agricultural machine is controlled to at least one of:

adjust a downforce exerted on the row unit by a downforce generation subsystem, adjust a height of the ground-engaging element, or control an actuator to vibrate the row unit.

19. The mobile agricultural machine of claim 14, wherein the mobile agricultural machine is controlled to at least one of:

control the rotational speed of the ground-engaging element, control a rotational direction of the ground-engaging element, or oscillate rotation of the ground-engaging element.

\* \* \* \* \*